United States Patent
Kadyrov et al.

(10) Patent No.: US 9,309,344 B2
(45) Date of Patent: Apr. 12, 2016

(54) PROCESS FOR PREPARING POLYMERS BY MEANS OF RING-OPENING POLYMERIZATION

(71) Applicant: EVONIK INDUSTRIES AG, Essen (DE)

(72) Inventors: Renat Kadyrov, Frankfurt (DE);
Christa Dumrath, Schwerin (DE);
Matthias Beller, Nienhagen (DE);
Andreas Dumrath, Schwerin (DE);
Helfried Neumann, Rostock (DE);
Stephanie Klein, Rheinbach (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/683,718

(22) Filed: Apr. 10, 2015

(65) Prior Publication Data

US 2015/0299362 A1    Oct. 22, 2015

(30) Foreign Application Priority Data

Apr. 16, 2014    (EP) .................................... 14164836

(51) Int. Cl.

| | |
|---|---|
| *C08G 61/08* | (2006.01) |
| *C08G 61/06* | (2006.01) |
| *C08F 4/80* | (2006.01) |
| *C08F 236/20* | (2006.01) |
| *C08F 32/00* | (2006.01) |
| *C08F 32/08* | (2006.01) |
| *B01J 31/22* | (2006.01) |

(52) U.S. Cl.
CPC ................. *C08F 236/20* (2013.01); *C08F 4/80* (2013.01); *C08F 32/00* (2013.01); *C08G 61/08* (2013.01); *B01J 31/2265* (2013.01); *B01J 31/2273* (2013.01); *B01J 31/2295* (2013.01); *C08F 32/08* (2013.01); *C08G 2261/3325* (2013.01); *C08G 2261/418* (2013.01)

(58) Field of Classification Search
CPC .. C08G 61/08; C08G 61/06; C08G 2261/418; C08F 4/80; C08F 236/20; C08F 236/00; B01J 31/2265; B01J 31/2269; B01J 31/2273; B01J 31/2295
See application file for complete search history.

(56) References Cited

U.S. PATENT DOCUMENTS

| | | | |
|---|---|---|---|
| 5,728,839 A | * | 3/1998 | Herrmann ............ B01J 31/2265 548/103 |
| 6,610,626 B2 | * | 8/2003 | Grubbs .................. C08G 61/06 502/155 |
| 7,329,758 B1 | | 2/2008 | Grubbs et al. |
| 2011/0319636 A1 | * | 12/2011 | Nordstrom ........... B01J 31/2265 548/537 |
| 2012/0220768 A1 | * | 8/2012 | Hong .................... C07C 231/10 544/176 |
| 2013/0041122 A1 | | 2/2013 | Holtcamp et al. |

FOREIGN PATENT DOCUMENTS

| | | |
|---|---|---|
| CN | 101186717 A | 5/2008 |
| EP | 1 197 509 A1 | 4/2002 |
| EP | 1 589 055 A1 | 10/2005 |
| EP | 1 847 558 A1 | 10/2007 |
| EP | 1 942 125 A1 | 7/2008 |
| EP | 2 280 033 A1 | 2/2011 |
| WO | WO-02/076613 A1 | 10/2002 |
| WO | WO2011/034506 A1 * | 3/2011 ............ C07C 231/00 |

OTHER PUBLICATIONS

Diez-Gonzalez, S.; Marion, N.; Nolan, S.P. Chem. Rev. 2009, 109, 3612-3676.*
Samojlowicz, C.; Bieniek, M.; Grela, K. Chem. Rev. 2009, 109, 3708-3742.*
Peec, L.H.; Plenio, H. Organometallics 2010-29, 2761-2766.*
Bantreil, X.; Randall, R.A.M.; Slawin, A.M.Z.; Nolan, S.P. Organometallics 2010, 29, 3007-3011.*
Prades, A.; Viciano, M.; Sanau, M.; Peris, E. Organometallics 2008, 27, 42554-4259.*
Kong, Y.; Xu, S.; Song, H.; Wang, B. Organometallics 2012, 31, 5527-5532.*
Csabai, P.; Joo, F.; Trzeciak, A.M.; Ziolkowski, J.J. J. Organomet. Chem. 2006, 691, 3371-3376.*
Delaude, L.; Delfosse, S.; Richel, A.; Demonceau, A.; Noels, A.F. Chem. Commun. 2003, 1526-1527.*

* cited by examiner

*Primary Examiner* — Rip A Lee
(74) *Attorney, Agent, or Firm* — Eric J. Evain; Ryan P. Cox; Reed Smith LLP

(57) ABSTRACT

The present invention relates to a process for preparing polymers by means of ring-opening metathetic polymerization, consisting of the following steps:
a) providing a reaction mixture consisting of a cycloalkene or a cycloalkene mixture, b) adding a ruthenium compound of the general formula $RuX^1X^2L^1_aL^2_b$ (I) where a=0 or 1, b=1 or 2, such that a+b=2;
$X^1$, $X^2$=independently selected anionic ligands; $L^1$=uncharged π-binding ligand; $L^2$=N-heterocyclic carbene of the formula IIa, IIb or IIc; c) adding a chain transfer agent in a molar ratio in the range from 1:5 to 1:1000 based on the cycloalkene or the sum total of the cycloalkenes in the cycloalkene mixture, d) converting at a temperature within a range from 0° C. to 250° C.

28 Claims, No Drawings

PROCESS FOR PREPARING POLYMERS BY MEANS OF RING-OPENING POLYMERIZATION

The present invention relates to a process for preparing polymers by means of ring-opening metathetic polymerization, comprising the following steps:
a) providing a reaction mixture consisting of a cycloalkene or a cycloalkene mixture, b) adding a ruthenium compound of the general formula $RuX^1X^2L^1_aL^2_b$ (I) where a=0 or 1, b=1 or 2, such that a+b=2; $X^1$, $X^2$=independently selected anionic ligands; $L^1$=uncharged π-binding ligand; $L^2$=N-heterocyclic carbene of the formula IIa, IIb or IIc; c) adding a chain transfer agent in a molar ratio in the range from 1:5 to 1:1000 based on the cycloalkene or the sum total of the cycloalkenes in the cycloalkene mixture, d) converting at a temperature within a range from 0° C. to 250° C.

In the last few decades, olefin metathesis has become established as an effective carbon-carbon bond-forming reaction, and finds wide use in organic synthesis and polymer science, and ring-opening metathetic polymerization (ROMP) of cycloalkenes enables an elegant and atom-efficient route to linear polymers (K. J. Ivin, J. C. Mol, Olefin Metathesis and Metathesis Polymerization, Academic Press, London, 1997; Handbook of Metathesis, R. H. Grubbs, Wiley-VCH, Weinheim, 2003, vol. 1-3). Typically, the polymerization reactions are catalysed by a number of transition metal complexes, often in the presence of a co-catalyst. Co-catalysts used are particularly aluminium organyls and tin organyls. Processes used in industry for preparation of polyoctenamers, such as the Vestenamer® 8012 or Vestenamer® 6213 product, are produced by means of "ill-defined" $WCl_6$-based catalysts in the presence of aluminium organyls such as diethylaluminium chloride (DEAC) (DE 102010030510A1). However, the use of alkylating agents such as aluminium organyls constitutes a safety risk to health and the environment, since they are inflammable, are pyrophoric in contact with air, and form flammable gases in contact with water, and also cause severe irritation to the skin and severe eye damage. The ROMP reactions therefore have to be conducted under an inert gas atmosphere and with extensively purified monomers. Moreover, large amounts of metal salts are required as catalyst (DE 102010030510A1: 0.055 mol % of $WCl_6$ in relation to the cyclooctene monomer, $WCl_6$:cyclooctene=1: 1800), which have to be separated from the product mixture after the polymerization.

As well as the ill-defined catalyst systems, well-defined catalysts are also used, for example, for the production of polydicyclopentadiene (U.S. Pat. No. 6,310,121 B1, U.S. Pat. No. 5,939,504). Ruthenium catalysts in particular have elevated tolerance to a multitude of different functional groups and a wide range of substrates. Particularly active olefin metathesis catalysts usually bear both phosphine ligands and nucleophilic heterocyclic carbene ligands (NHC ligands), and additionally have a metal-carbene structure. The Ru complexes, some which are commercially available, have the general structure $RuX_2(=CR_2)LL'$ where X is an anionic ligand, R is selected from the group consisting of hydrogen, $(C_6-C_{14})$-aryl and $(C_3-C_{14})$-heteroaryl radical, and L and L' denote an uncharged electron donor ligand, where L is an N-heterocyclic carbene and L' is a phosphine. The synthesis of these ruthenium-carbene complexes is comparatively complex, raw material-intensive and costly. Typical synthesis protocols consist of several stages, in some cases requiring complex process operation under inert gas atmosphere, starting materials that are difficult to obtain, or the utilization of co-reactants that are of relevance in terms of safety. Especially the utilization of carbene precursors, such as disubstituted cyclopropenes (WO 93/20111), diazoalkanes (WO 97/06185) or acetylenes (DE 19854869) constitute a considerable safety risk on the industrial scale, and should accordingly be avoided. Organometallic starting materials such as $RuCl_2(PPh_3)_3$ (Hill et al., Dalton 1999, 285-291) or $RuHCl(PPh_3)_3$ (Hoffmann et al., Journal of Organometallic Chemistry 2002, 641, 220-226) are prepared from $RuCl_3$ using a large excess of triphenylphosphine ($PPh_3$), and these $PPh_3$ ligands are lost through a ligand exchange reaction in the subsequent catalyst synthesis. The most recent synthesis improvements can partly compensate for this disadvantage through the direct reaction of tricyclohexylphosphine with ruthenium chloride hydrate or $Ru(COD)Cl_2$ to give the $(PCy_3)_2RuCl_2$— carbene complexes (WO 2009/124977). However, large amounts of $PCy_3$ or $PCy_3$ solution are still required. Moreover, in the synthesis of the second generation of ruthenium-carbene complexes, one of these $PCy_3$ ligands is exchanged for an uncharged electron donor ligand, which again results in loss of $PCy_3$ from the complex. Less expensive alternatives to ruthenium-phosphine complexes are uncharged or anionic ruthenium-aryl complexes according to the general structure $[RuX(=C=[C]_n=CR_2)L^1L^2]Y$ (EP 0921129A1). X and R are as defined above, Y are anionic, weakly coordinating ligands, $L^1$ are phosphines, phosphites, phosphonites, phosphinites, arsines or stibines, $L^2$ is benzene or a substituted benzene derivative, for example p-cymene. A disadvantage is that the structural unit $Ru=C=[C]_n=CR_2$ is also of relevance for the activity of the ruthenium-aryl complexes, and this in turn requires the utilization of carbene precursors that are hazardous, difficult to obtain or very sensitive.

A multitude of examples of catalytic systems generated "in situ" from available ruthenium precursors have already been described as an alternative approach. To obtain the active catalyst, however, various activation methods are used:

Photochemical Activation

A. Hafner, A. Mühlebach, P. A. van der Schaaf, Angew. Chem. 1997, 109, 2213-2216; Angew. Chem. Int. Ed., 1997, 36, 2213-2216;

L. Delaude, A. Demonceau and A. F. Noels, Chem. Commun., 2001, 986-987;

A. Fürstner, and L. Ackermann, Chem. Commun., 1999, 95-96;

L. Jafarpour, J. Huang, E. D. Stevens, S. P. Nolan Organometallics 1999, 18, 3760-3763)

Activation Via Carbene Precursors Such as Trimethylsilyldiazomethane

A. W. Stumpf, E. Saive, A. Demonceau and A. F. Noels, Chem. Commun., 1995, 1127;

A. Demonceau, A. W. Stumpf, E. Saive and A. F. Noels, Macromolecules, 1997, 30, 2127

Activation with Alkynes

Y. Miyaki, T. Onishi, S. Ogoshi, H. Kurosawa, J. Organometallic Chem. 2000, 616, 135-139;

J. Louie, R. H. Grubbs, Angew. Chem. Int. Ed. 2001, 40, 247-249;

D. Sémeril, C. Bruneau, P. H. Dixneuf, Helv. Chim. Acta 2001, 84, 3335-3341;

D. Sémeril, C. Bruneau, P. H. Dixneuf Adv. Synth. Catal. 2002, 344, 585-595

In addition, EP1197509A1 described a process for ring-opening polymerization of cycloolefins, in which a catalyst of the general formula $((X_1)_m(L_1)_n(Ru)_z$ can also be used, where $X_1$ are independently selected anionic ligands and $L_1$ are independently selected uncharged electron donor ligands, and where m is an integer from 0 to 4, and n and z are integers from 1 to 4.

It is therefore an object of the present invention to provide a process for preparing polymers by means of ring-opening metathetic polymerization, in which the catalyst is to be generated from inexpensive ruthenium compounds, but does not require the above-described activating agents. In addition, the amount of catalyst for the polymerization is to be reduced, and an improved activity of the catalyst is to be achieved at the same time.

In the context of the present invention, the term "polymer" refers both to olefinic oligomers or polymers which are prepared by ring-opening polymerization of cycloalkenes and to aliphatic oligomers or polymers which are prepared by the hydrogenation of olefinic oligomers or polymers obtained by ring-opening polymerization. Olefinic oligomers or polymers are also referred to as polyalkenamers, which can be regarded as a polyalkene of a cycloalkene. Aliphatic oligomers or polymers are also called polyalkanamers.

The technical object is achieved by a process for preparing polymers by means of ring-opening metathetic polymerization, comprising the following steps:
a. providing a reaction mixture consisting of a cycloalkene or a cycloalkene mixture,
b. adding a ruthenium compound of the general formula $RuX^1X^2L^1_aL^2_b$ (I) where
a=0 or 1, b=1 or 2, such that a+b=2;
$X^1$, $X^2$=independently selected anionic ligands;
$L^1$=uncharged π-binding ligand;
$L^2$=N-heterocyclic carbene of the formula IIa, IIb or IIc

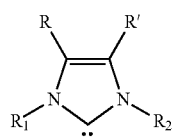

(IIa)

where
R and R' are each independently selected from the group consisting of methyl, ethyl, n-propyl, isopropyl, n-butyl, isobutyl, phenyl and p-methoxyphenyl; and
$R_1$ and $R_2$ are each independently selected from the group consisting of hydrogen, $(C_1$-$C_{18})$-alkyl, $(C_3$-$C_8)$-cycloalkyl, $(C_3$-$C_7)$-heterocycloalkyl, $(C_6$-$C_{14})$-aryl, and $(C_3$-$C_{14})$-heteroaryl;

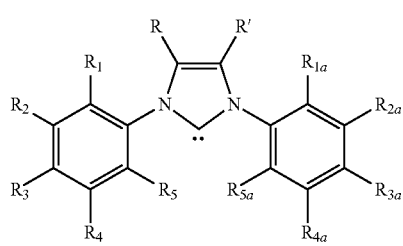

(IIb)

where
R and R' are each independently selected from the group consisting of H, methyl, ethyl, n-propyl, isopropyl, n-butyl, isobutyl, phenyl and p-methoxyphenyl; and
$R_1$, $R_2$, $R_3$, $R_4$, $R_5$, $R_{1a}$, $R_{2a}$, $R_{3a}$, $R_{4a}$, $R_{5a}$, are each independently selected from the group consisting of H, methyl, ethyl, n-propyl, isopropyl, n-butyl, isobutyl, tert-butyl and methoxy;

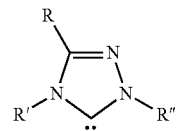

(IIc)

where
R is selected from the group consisting of H, methyl, ethyl, n-propyl, isopropyl, n-butyl, isobutyl, phenyl and p-methoxyphenyl; and
R' and R" are each independently selected from the group consisting of hydrogen, $(C_1$-$C_{18})$-alkyl, $(C_3$-$C_8)$-cycloalkyl, $(C_3$-$C_7)$-heterocycloalkyl, $(C_6$-$C_{14})$-aryl, and $(C_3$-$C_{14})$-heteroaryl;
c. adding a chain transfer agent in a molar ratio in the range from 1:5 to 1:1000 based on the cycloalkene or the sum total of the cycloalkenes in the cycloalkene mixture,
d. converting at a temperature within a range from 0° C. to 250° C.

In the context of the present invention, the reaction mixture consists of a cycloalkene or a cycloalkene mixture. A cycloalkene mixture means two or more cycloalkenes, especially two, three or four cycloalkenes, preference being given to two cycloalkenes. Preferably, the reaction mixture consists of one cycloalkene.

In the context of the present invention, the term "cycloalkene" relates to all kinds of cyclic alkenes, irrespective of whether they are cyclic mono-, di- or polyenes.

Cycloalkenes may also be substituted, in which case they may additionally contain internal or terminal C—C double bonds.

A cyclic substituted alkene having internal C—C double bonds in the side chain refers to a cyclic alkene wherein the additional C—C double bond is not on the alpha-carbon of the side chain, the alpha-carbon atom referring to that carbon atom which is farthest from the bonding site to the cycloalkene.

A cyclic substituted alkene having terminal C—C double bonds refers to a cyclic alkene wherein the additional C—C double bond is on the alpha-carbon of the side chain, the alpha-carbon atom referring to that carbon atom which is farthest from the bonding site to the cycloalkene.

The substituents of the cycloalkenes are selected from the group consisting of
—{$C_1$-$C_{20}$}-alkyl,
—{$C_3$-$C_8$}-cycloalkyl,
—{$C_3$-$C_7$}-heterocycloalkyl,
—{$C_6$-$C_{14}$}-aryl,
—{$C_3$-$C_{14}$}-heteroaryl,
—{$C_6$-$C_{14}$}-aralkyl,
—{$C_1$-$C_{20}$}-alkyloxy,
—{$C_6$-$C_{14}$}-aryloxy,
—{$C_6$-$C_{14}$}-aralkyloxy,
—{$C_1$-$C_{20}$}-alkylthio,
—{$C_6$-$C_{14}$}-arylthio,
—{$C_6$-$C_{14}$}-aralkylthio,
—{$C_1$-$C_8$}-acyl,
—{$C_1$-$C_8$}-acyloxy,
—OH,
—$NH_2$,
—NH({$C_1$-$C_{20}$}-alkyl),
—NH({$C_6$-$C_{14}$}-aryl), —NH({C$_6$-C$_{14}$}-aralkyl),
—NH({C$_1$-C$_8$}-acyl),
—NH({C$_1$-C$_8$}-acyloxy),
—N({C$_1$-C$_{20}$}-alkyl)$_2$,
—N({C$_6$-C$_{14}$}-aryl)$_2$,
—N({C$_6$-C$_{14}$}-aralkyl)$_2$,
—N({C$_1$-C$_{20}$}-alkyl)({C$_6$-C$_{14}$}-aryl),
—N({C$_1$-C$_8$}acyl)$_2$,
—NH$_3^+$,
—NH({C$_1$-C$_{20}$}-alkyl)$_2^+$,
—NH({C$_6$-C$_{14}$}-aryl)$_2^+$,
—NH({C$_6$-C$_{14}$}-aralkyl)$_2^+$,
—NH({C$_1$-C$_{20}$}-alkyl)({C$_6$-C$_{14}$}-aryl)$^+$,
—NH({C$_6$-C$_{14}$}-aryl)({C$_1$-C$_{20}$}-alkyl)$^+$,
—N({C$_6$-C$_{14}$}-aryl)({C$_1$-C$_{20}$})-alkyl)$_2^+$,
—N({C$_6$-C$_{14}$}aryl)$_2$({C$_1$-C$_{20}$}-alkyl)$^+$,
—NO$_2$,
=O,
—C(=O)—O—{C$_1$-C$_{20}$}-alkyl,
—C(=O)—O—{C$_6$-C$_{14}$}-aryl,
—C(=O)—O—{C$_6$-C$_{14}$}-aralkyl,
—O—C(=O)—O—{C$_1$-C$_{20}$}-alkyl,
—O—C(=O)—O—{C$_6$-C$_{14}$}-aryl,
—O—C(=O)—O—{C$_6$-C$_{14}$}-aralkyl,
—NH—C(=O)—O—{C$_1$-C$_{20}$}-alkyl,
—NH—C(=O)—O—{C$_6$-C$_{14}$}-aryl,
—NH—C(=O)—O—{C$_6$-C$_{14}$}-aralkyl,
—O—C(=O)—NH—{C$_1$-C$_{20}$}-alkyl,
—O—C(=O)—NH—{C$_6$-C$_{14}$}-aryl,
—O—C(=O)—NH—{C$_6$-C$_{14}$}-aralkyl,
—NH—C(=O)—NH$_2$,
—NH—C(=O)—NH—{C$_1$-C$_{20}$}-alkyl,
—NH—C(=O)—NH—{C$_6$-C$_{14}$}-aryl,
—NH—C(=O)—NH—{C$_6$-C$_{14}$}-aralkyl,
—CN,
-halogen,
—C(=N—{C$_1$-C$_{20}$}-alkyl)-{C$_1$-C$_{20}$}-alkyl,
—C(=N—{C$_6$-C$_{14}$}-aryl)-{C$_1$-C$_{20}$}-alkyl,
—C(=N—{C$_1$-C$_{20}$})-alkyl)-{C$_6$-C$_{14}$}-aryl,
—C(=N—{C$_6$-C$_{14}$}-aryl)-{C$_6$-C$_{14}$}-aryl,
—SO$_2$—O—{C$_1$-C$_{20}$}-alkyl,
—SO$_2$—O—{C$_6$-C$_{14}$}-aryl,
—SO$_2$—O—{C$_6$-C$_{14}$}-aralkyl,
—SO$_2$—{C$_1$-C$_{20}$}-alkyl,
—SO$_2$—{C$_6$-C$_{14}$}-aryl,
—SO$_2$—{C$_6$-C$_{14}$}-aralkyl,
—SO—{C$_1$-C$_{20}$}-alkyl,
—SO—{C$_6$-C$_{14}$}-aryl,
—SO—{C$_6$-C$_{14}$}-aralkyl,
—Si({C$_1$-C$_{20}$}-alkyl)$_3$,
—Si({C$_6$-C$_{14}$}-aryl)$_3$,
—Si({C$_6$-C$_{14}$}-aryl)({C$_1$-C$_{20}$}-alkyl)$_2$,
—Si({C$_6$-C$_{14}$}-aryl)$_2$, ({C$_1$-C$_{20}$}-alkyl),
—{C$_1$-C$_{20}$}-perfluoroalkyl,
—PO(O—{C$_1$-C$_{20}$}-alkyl)$_2$,
—PO(O—{C$_6$-C$_{14}$}-aryl)$_2$,
—PO(O—{C$_1$-C$_{20}$}-alkyl)(O—{C$_6$-C$_{14}$}-aryl),
—PO({C$_1$-C$_{20}$}-alkyl)$_2$,
—PO({C$_6$-C$_{14}$}-aryl)$_2$,
—PO({C$_1$-C$_{20}$}-alkyl) ({C$_6$-C$_{14}$}-aryl).

Examples of cycloalkenes are the cyclic alkenes of the general formulae (a)-(c), where n may independently be 1, 2, 3, 4, 5, 6, 7, 8, 9, 10, 11, 12, 13, 14, 15, 16, 17, 18, and 1 to 4 carbon atoms may each be replaced by a heteroatom selected from the group consisting of N, O, S, P and Si, and the hydrogen atoms in the (C$_n$H$_{2n}$), NH, PH, POH and SiH$_2$ radicals may be substituted.

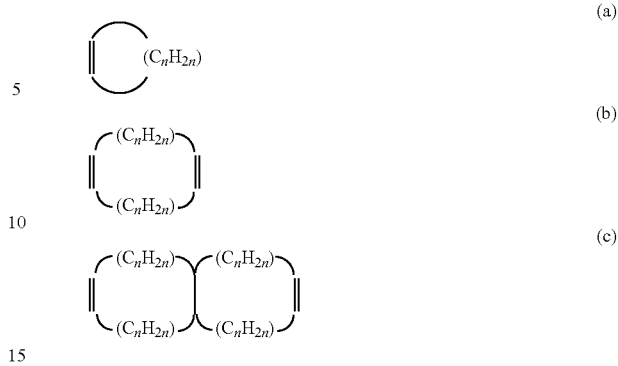

Preference is given to cyclic alkenes of the general formulae (a)-(c) having a ring size of 5, 6, 7, 8, 9 or 10 carbon atoms, which may be unsubstituted or substituted, where the substituents are selected from the above-described group of substituents for cycloalkenes.

Examples of preferred cycloalkenes are the following compounds:

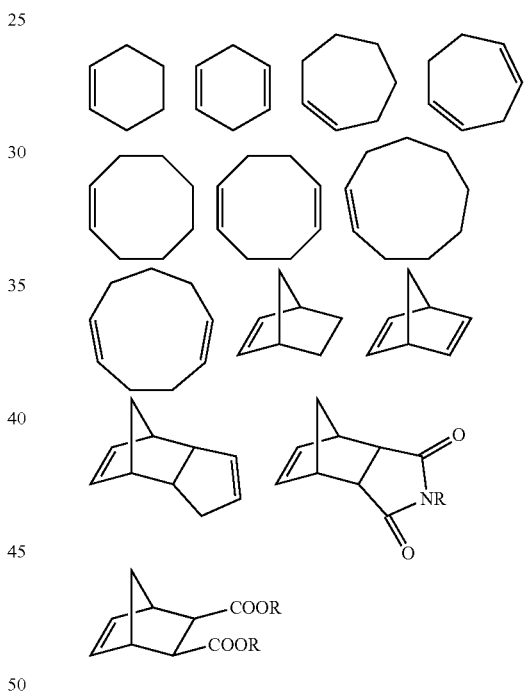

where R is (C$_1$-C$_{18}$)-alkyl or (C$_6$-C$_{12}$)-aryl, preferably where R=methyl or ethyl.

More preferably, the cycloalkenes are selected from the group consisting of the following compounds:

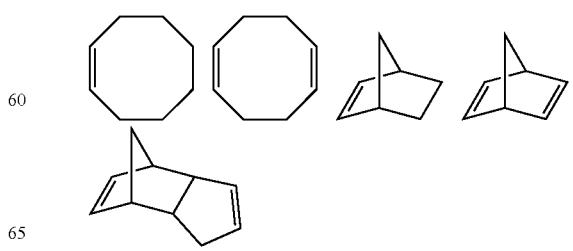

In the context of the present invention, the ruthenium compound of the general formula $RuX^1X^2L^1_aL^2_b$ (I) refers to a compound for which a=0 or 1, b=1 or 2, such that a+b=2;
$X^1$, $X^2$=independently selected anionic ligands;
$L^1$=uncharged π-binding ligand;
$L^2$=N-heterocyclic carbene of the formula IIa, IIb or IIc

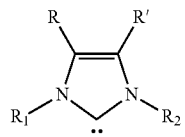
(IIa)

where
R and R' are each independently selected from the group consisting of methyl, ethyl, n-propyl, isopropyl, n-butyl, isobutyl, phenyl and p-methoxyphenyl; and
$R_1$ and $R_2$ are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;

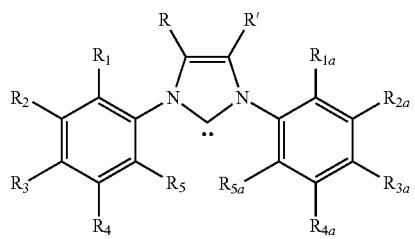
(IIb)

where
R and R' are each independently selected from the group consisting of H, methyl, ethyl, n-propyl, isopropyl, n-butyl, isobutyl, phenyl and p-methoxyphenyl; and
$R_1$, $R_2$, $R_3$, $R_4$, $R_5$, $R_{1a}$, $R_{2a}$, $R_{3a}$, $R_{4a}$, $R_{5a}$ are each independently selected from the group consisting of H, methyl, ethyl, n-propyl, isopropyl, n-butyl, isobutyl, tert-butyl and methoxy;

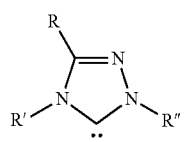
(IIc)

where
R is selected from the group consisting of H, methyl, ethyl, n-propyl, isopropyl, n-butyl, isobutyl, phenyl and p-methoxyphenyl; and
R' and R" are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl.

Examples of N-heterocyclic carbenes are compounds of the formulae III to VIII:

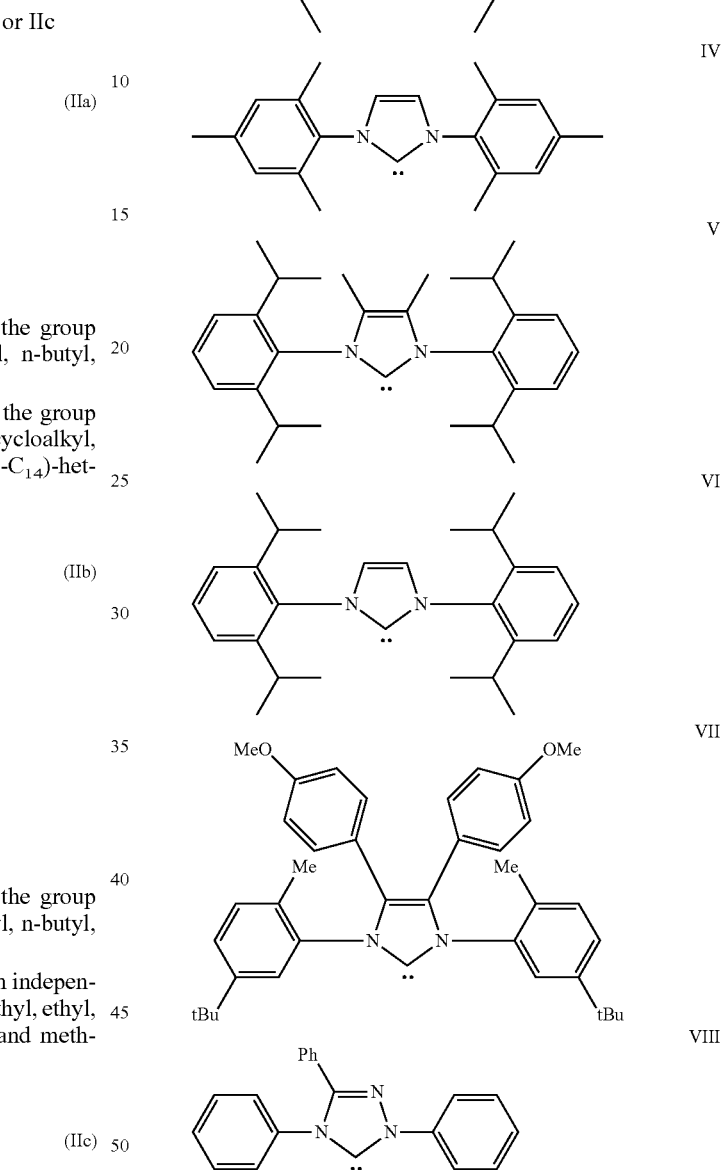

preference being given to the compounds III, IV, VI and VII, particular preference to the compounds III, VI and VII.

N-Heterocyclic carbenes can be obtained in situ by thermal activation of carbene adducts or the combination of an N-heterocyclic carbene precursor and a base. The base used may be any inorganic or organic base, preference being given to using nitrogen bases or an alkyloxy base. Particular preference is given to alkyloxy bases which are selected from the group comprising sodium and potassium salts of methoxide, ethoxide, propoxide or butoxide and isomers thereof. Typical examples of carbene adducts are adducts of N-heterocyclic carbenes with alcohols, chloroform, pentafluorophenol, $CO_2$ and borane.

In the context of the present invention, an anionic ligand denotes a singly or multiply negatively charged ligand which is independently selected from the group consisting of halide, pseudohalide, tetraphenylborate, hexahalophosphate, methanesulphonate, trihalomethanesulphonate, arylsulphonate, alkoxide, aryloxide, carboxylate, sulphate or phosphate.

Pseudohalides are ligands having similar chemical behaviour to the halides, preferred pseudohalides being cyanide ($CN^-$), cyanate ($OCN^-$) or thiocyanate ($SCN^-$). Preference is given to anionic ligands selected independently from the group consisting of the halides fluoride, chloride, bromide and iodide, particular preference being given to chloride.

An uncharged π-binding ligand is understood to mean a monocyclic or polycyclic arene which may also have substituents which may be identical or non-identical, where the substituents are selected from the group consisting of ($C_1$-$C_{20}$)-alkyl-, ($C_6$-$C_{14}$)-aryl-, ($C_1$-$C_{20}$)-alkyloxy-, ($C_6$-$C_{14}$)-aryloxy-, ($C_1$-$C_{20}$)-perfluoroalkyl-, ($C_1$-$C_{20}$)-alkylthio-, ($C_2$-$C_{10}$)-alkenylthio-, ($C_2$-$C_{10}$)-alkenyl-, ($C_2$-$C_{10}$)-alkynyl-, ($C_2$-$C_{10}$)-alkenyloxy-, ($C_2$-$C_{10}$)-alkynyloxy-, and halogen. The substituents may in turn likewise be substituted, in which case these substituents are selected from the group consisting of halogen, ($C_1$-$C_8$)-alkyl, ($C_1$-$C_8$)-alkyloxy, —$NH_2$, —NO, —$NO_2$, $NH(C_1$-$C_8)$-alkyl, —$N((C_1$-$C_8)$-alkyl$)_2$, —OH, —$CF_3$, —$C_nF_{2n+1}$ (where n is 2, 3, 4 or 5), $NH(C_1$-$C_8)$-acyl, —$N((C_1$-$C_8)$-acyl$)_2$, ($C_1$-$C_8$)-acyl, ($C_1$-$C_8$)-acyloxy, —$SO_2$—($C_1$-$C_8$)-alkyl, —$SO_2$—($C_6$-$C_{14}$)-aryl, —SO—($C_1$-$C_8$)-alkyl, —SO—($C_6$-$C_{14}$)-aryl, —PO(O—{$C_1$-$C_{20}$}-alkyl$)_2$, —PO(O—{$C_6$-$C_{14}$}-aryl$)_2$, —PO(O—{$C_1$-$C_{20}$}-alkyl) (O—{$C_6$-$C_{14}$}-aryl), —PO({$C_1$-$C_{20}$}-alkyl$)_2$, —PO({$C_6$-$C_{14}$}-aryl$)_2$, —PO({$C_1$-$C_{20}$}-alkyl)({$C_6$-$C_{14}$}-aryl). Examples of uncharged π-binding ligands are benzene, toluene, xylene, p-cymene, trimethylbenzene, tetramethylbenzene, hexamethylbenzene, tetrahydronaphthalene and naphthalene. More preferably, the uncharged π-binding ligand is selected from the group consisting of benzene, p-cymene and hexamethylbenzene.

In the context of the present invention, ($C_1$-$C_n$)-alkyl is defined as linear or branched ($C_1$-$C_n$)-alkyl group having 1 to n carbon atoms. Typical examples of $C_1$-$C_n$-alkyl groups are methyl, ethyl, n-propyl, isopropyl, n-butyl, isobutyl, sec-butyl, tert-butyl, pentyl, hexyl, heptyl, octyl, nonyl, decyl, dodecyl or octadecyl, including all the bonding isomers thereof. A ($C_1$-$C_n$)-alkyl group may also be substituted by at least one substituent, in which case the substituents are each independently selected from the group consisting of halogen, ($C_1$-$C_8$)-alkyl, ($C_1$-$C_8$)-alkyloxy, —$NH_2$, —NO, —$NO_2$, $NH(C_1$-$C_8)$-alkyl, —$N((C_1$-$C_8)$-alkyl$)_2$, —OH, —$CF_3$, —$C_nF_{2n+1}$ (where n is an integer from 2 to 5), $NH(C_1$-$C_8)$-acyl, —$N((C_1$-$C_8)$-acyl$)_2$, ($C_1$-$C_8$)-acyl, ($C_1$-$C_8$)-acyloxy, —$SO_2$—($C_1$-$C_8$)-alkyl, —$SO_2$—($C_6$-$C_{14}$)-aryl, —SO—($C_1$-$C_8$)-alkyl, —SO—($C_6$-$C_{14}$)-aryl, —PO(O—{$C_1$-$C_{20}$}-alkyl$)_2$, —PO(O—{$C_6$-$C_{14}$}-aryl$)_2$, PO(O—{$C_1$-$C_{20}$}-alkyl) (O—{$C_6$-$C_{14}$}-aryl), —PO({$C_1$-$C_{20}$}-alkyl$)_2$, PO({$C_6$-$C_{14}$}-aryl$)_2$, —PO({$C_1$-$C_{20}$}-alkyl) ({$C_6$-$C_{14}$}-aryl).

In the context of the present invention, ($C_3$-$C_n$)-cycloalkyl denotes a cyclic alkyl group having 3 to n carbon atoms, including mono-, bi- and tricyclic alkyl groups. Typical examples are cyclopropyl, cyclobutyl, cyclopentyl, cyclohexyl and cycloheptyl. A ($C_1$-$C_n$)-cycloalkyl group may also be substituted by at least one substituent, in which case the substituents are each independently selected from the group consisting of halogen, ($C_1$-$C_8$)-alkyl, ($C_1$-$C_8$)-alkyloxy, —$NH_2$, —NO, —$NO_2$, $NH(C_1$-$C_8)$-alkyl, —$N((C_1$-$C_8)$-alkyl$)_2$, —OH, —$CF_3$, —$C_nF_{2n+1}$, (where n is an integer from 2 to 5), $NH(C_1$-$C_8)$-acyl, —$N((C_1$-$C_8)$-acyl$)_2$, ($C_1$-$C_8$)-acyl, ($C_1$-$C_8$)-acyloxy, —$SO_2$—($C_1$-$C_8$)-alkyl, —$SO_2$—($C_6$-$C_{14}$)-aryl, —SO—($C_1$-$C_8$)-alkyl, —SO—($C_6$-$C_{14}$)-aryl, —PO(O—{$C_1$-$C_{20}$}-alkyl$)_2$, —PO(O—{$C_6$-$C_{14}$}-aryl$)_2$, PO(O—{$C_1$-$C_{20}$}-alkyl) (O—{$C_6$-$C_{14}$}-aryl), —PO({$C_1$-$C_{20}$}-alkyl$)_2$, PO({$C_6$-$C_{14}$}-aryl$)_2$, —PO({$C_1$-$C_{20}$}-alkyl) ({$C_6$-$C_{14}$}-aryl).

In the context of the present invention, ($C_2$-$C_n$)-heterocycloalkyl denotes a cyclic alkyl group having 2 to n carbon atoms, including mono-, bi- and tricyclic alkyl groups, in which 1 or 2 carbon atoms in the cycle are each replaced by a heteroatom selected from the group consisting of N, O and S. A ($C_2$-$C_n$)-heterocycloalkyl group may also be substituted by at least one substituent, in which case the substituents are each independently selected from the group consisting of halogen, ($C_1$-$C_8$)-alkyl, ($C_1$-$C_8$)-alkyloxy, —$NH_2$, —NO, —$NO_2$, $NH(C_1$-$C_8)$-alkyl, —$N((C_1$-$C_8)$-alkyl$)_2$, —OH, —$CF_3$, —$C_nF_{2n+1}$ (where n is an integer from 2 to 5), $NH(C_1$-$C_8)$-acyl, —$N((C_1$-$C_8)$-acyl$)_2$, ($C_1$-$C_8$)-acyl, ($C_1$-$C_8$)-acyloxy, —$SO_2$—($C_1$-$C_8$)-alkyl, —$SO_2$—($C_6$-$C_{14}$)-aryl, —SO—($C_1$-$C_8$)-alkyl, —SO—($C_6$-$C_{14}$)-aryl, —PO(O—{$C_1$-$C_{20}$}-alkyl$)_2$, —PO(O—{$C_6$-$C_{14}$}-aryl$)_2$, —PO(O—{$C_1$-$C_{20}$}-alkyl) (O—{$C_6$-$C_{14}$}-aryl), —PO({$C_1$-$C_{20}$}-alkyl$)_2$, —PO({$C_6$-$C_{14}$}-aryl$)_2$, —PO({$C_1$-$C_{20}$}-alkyl)({$C_6$-$C_{14}$}-aryl). Typical examples are 2- or 3-tetrahydrofuryl, 1-, 2- or 3-pyrrolidinyl, 1-, 2-, 3- or 4-piperidinyl, 1-, 2- or 3-morpholinyl, 1- or 2-piperazinyl, 1-caprolactyl.

In the context of the present invention, ($C_6$-$C_n$)-aryl is a cyclic aromatic group having 6 to n carbon atoms. In particular, this includes compounds such as phenyl, naphthyl, anthryl, phenanthryl, biphenyl radicals, or systems of the above-described type fused to the molecule in question, for example indenyl systems. A ($C_6$-$C_n$)-aryl group may also be substituted by at least one substituent, in which case the substituents are each independently selected from the group consisting of halogen, ($C_1$-$C_8$)-alkyl, ($C_1$-$C_8$)-alkyloxy, —$NH_2$, —NO, —$NO_2$, $NH(C_1$-$C_8)$-alkyl, —$N((C_1$-$C_8)$-alkyl$)_2$, —OH, —$CF_3$, —$C_nF_{2n+1}$ (where n is an integer from 2 to 5), $NH(C_1$-$C_8)$-acyl, —$N((C_1$-$C_8)$-acyl$)_2$, ($C_1$-$C_3$)-acyl, ($C_1$-$C_8$)-acyloxy, —$SO_2$—($C_1$-$C_8$)-alkyl, —$SO_2$—($C_6$-$C_{14}$)-aryl, —SO—($C_1$-$C_8$)-alkyl, —SO—($C_6$-$C_{14}$)-aryl, —PO(O—{$C_1$-$C_{20}$}-alkyl$)_2$, —PO(O—{$C_6$-$C_{14}$}-aryl$)_2$, —PO(O—{$C_1$-$C_{20}$}-alkyl) (O—{$C_6$-$C_{14}$}-aryl), —PO({$C_1$-$C_{20}$}-alkyl$)_2$, —PO({$C_6$-$C_{14}$}-aryl$)_2$, —PO({$C_1$-$C_{20}$}-alkyl) ({$C_6$-$C_{14}$}-aryl).

In the context of the present invention, ($C_3$-$C_n$)-heteroaryl denotes a five-, six- or seven-membered aromatic ring system composed of 3 to n carbon atoms, where 1 to 3 carbon atoms in the ring system are each replaced by a heteroatom selected from the group consisting of N, O and S. Such heteroaryl groups are regarded as being especially groups such as 2-, 3-furyl, 2-, 3-pyrrolyl, 2-, 3-thienyl, 2-, 3-, 4-pyridyl, 2-, 3-, 4-, 5-, 6-, 7-indolyl, 3-, 4-, 5-pyrazolyl, 2-, 4-, 5-imidazolyl, acridinyl, quinolinyl, phenanthridinyl, 2-, 4-, 5-, 6-pyrimidinyl. A ($C_3$-$C_n$)-heteroaryl group may also be substituted by at least one substituent, in which case the substituents are each independently selected from the group consisting of halogen, ($C_1$-$C_8$)-alkyl, ($C_1$-$C_8$)-alkyloxy, —$NH_2$—NO, —$NO_2$, $NH(C_1$-$C_8)$-alkyl, —$N((C_1$-$C_8)$-alkyl$)_2$, —OH, —$CF_3$, —$C_nF_{2n+1}$ (where n is an integer from 2 to 5), $NH(C_1$-$C_8)$-acyl, —$N((C_1$-$C_8)$-acyl$)_2$, ($C_1$-$C_8$)-acyl, ($C_1$-$C_8$)-acyloxy, —$SO_2$—($C_1$-$C_8$)-alkyl, —$SO_2$—($C_6$-$C_{14}$)-aryl, —SO—($C_1$-$C_8$)-alkyl, —SO—($C_6$-$C_{14}$)-aryl, —PO(O—{$C_1$-$C_{20}$}-alkyl$)_2$, —PO(O—{$C_6$-$C_{14}$}-aryl$)_2$, —PO(O—{$C_1$-$C_{20}$}-alkyl) (O—{$C_6$-$C_{14}$}-aryl), —PO({$C_1$-$C_{20}$}-alkyl$)_2$, —PO({$C_6$-$C_{14}$}-aryl$)_2$, —PO({$C_1$-$C_{20}$}-alkyl) ({$C_6$-$C_{14}$}-aryl).

In the context of the present invention, ($C_6$-$C_n$)-aralkyl denotes a group containing both an alkyl group and an aryl group, and having a total of 6 to n carbon atoms. The aralkyl group may be bonded to the molecule bearing this group via any of its carbon atoms. A ($C_6$-$C_n$)-aralkyl group may also be substituted by at least one substituent, in which case the substituents are each independently selected from the group consisting of halogen, $(C_1-C_8)$-alkyl, $(C_1-C_8)$-alkyloxy, $-NH_2$, $-NO$, $-NO_2$, $NH(C_1-C_8)$-alkyl, $-N((C_1-C_8)$-alkyl$)_2$, $-OH$, $-CF_3$, $-C_nF_{2n+1}$ (where n is an integer from 2 to 5), $NH(C_1-C_8)$-acyl, $-N((C_1-C_8)$-acyl$)_2$, $(C_1-C_8)$-acyl, $(C_1-C_8)$-acyloxy, $-SO_2-(C_1-C_8)$-alkyl, $-SO_2-(C_6-C_{14})$-aryl, $-SO-(C_1-C_8)$-alkyl, $-SO-(C_6-C_{14})$-aryl, $-PO(O-\{C_1-C_{20}\}$-alkyl$)_2$, $-PO(O-\{C_6-C_{14}\}$-aryl$)_2$, $-PO(O-\{C_1-C_{20}\}$-alkyl$)(O-\{C_6-C_{14}\}$-aryl$)$, $-PO(\{C_1-C_{20}\}$-alkyl$)_2$, $-PO(\{C_6-C_{14}\}$-aryl$)$ 2, $-PO(\{C_1-C_{20}\}$-alkyl$)(\{C_8-C_{14}\}$-aryl$)$.

In the context of the present invention, $(C_1-C_n)$-alkyloxy is defined as a linear or branched $(C_1-C_n)$-alkyl group having 1 to n carbon atoms, with the proviso that it is bonded to the molecule bearing this group via an oxygen atom.

In the context of the present invention, $(C_6-C_n)$-aryloxy is defined as a $(C_6-C_n)$-aryl group having 6 to n carbon atoms, with the proviso that it is bonded to the molecule bearing this group via an oxygen atom.

In the context of the present invention, $(C_6-C_n)$-aralkyloxy is defined as a $(C_6-C_n)$-aralkyl group having 6 to n carbon atoms, with the proviso that it is bonded to the molecule bearing this group via an oxygen atom.

In the context of the present invention, $(C_1-C_n)$-alkylthio is defined as a linear or branched $(C_1-C_n)$-alkyl group having 1 to n carbon atoms, with the proviso that it is bonded to the molecule bearing this group via a sulphur atom.

In the context of the present invention, $(C_6-C_n)$-arylthio is defined as a $(C_6-C_n)$-aryl group having 6 to n carbon atoms, with the proviso that it is bonded to the molecule bearing this group via a sulphur atom.

In the context of the present invention, $(C_6-C_n)$-aralkylthio is defined as a $(C_6-C_n)$-aralkyl group having 6 to n carbon atoms, with the proviso that it is bonded to the molecule bearing this group via a sulphur atom.

In the context of the present invention, $(C_1-C_n)$-acyl denotes a group having the general structure $R-(C=O)-$ having a total of 1 to n carbon atoms, where R is selected from the group consisting of H, $(C_1-C_{n-1})$-alkyl, $(C_1-C_{n-1})$-alkenyl, $(C_6-C_{n-1})$-aryl, $(C_6-C_{n-1})$-heteroaryl and $(C_2-C_{n-1})$-alkynyl.

In the context of the present invention, $(C_1-C_n)$-acyloxy denotes a group having the general structure $R'-(C=O)O-$ having a total of 1 to n carbon atoms, where R' is selected from the group consisting of H, $(C_1-C_{n-1})$-alkyl, $(C_1-C_{n-1})$-alkenyl, $(C_6-C_{n-1})$-aryl, $(C_6-C_{n-1})$-heteroaryl and $(C_2-C_{n-1})$-alkynyl.

In the context of the present invention, $(C_2-C_n)$-alkenyl is defined as linear or branched $(C_2-C_n)$-alkyl group having 2 to n carbon atoms, with the proviso that it has a C—C double bond.

In the context of the present invention, $(C_2-C_n)$-alkynyl is defined as linear or branched $(C_2-C_n)$-alkyl group having 2 to n carbon atoms, with the proviso that it has a C—C triple bond.

In the context of the present invention, a $(C_2-C_n)$-alkylene bridge is defined as a divalent linear $(C_2-C_n)$-alkyl group having 2 to n carbon atoms. Typical examples are ethylene, n-propylene, n-butylene, n-pentylene, n-hexylene, n-heptylene, n-octylene, n-nonylene, n-decylene. The $(C_2-C_n)$-alkylene group may also have substituents selected from the group consisting of $(C_1-C_{20})$-alkyl, $(C_6-C_{14})$-aryl, $(C_2-C_{10})$-alkenyl. In addition, the $(C_2-C_n)$-alkylene group may be unsaturated, in which case the unsaturated section may be part of an aromatic or heteroaromatic system.

In the context of the present invention, a $(C_2-C_n)$-heteroalkylene bridge is defined as a divalent linear $(C_2-C_n)$-alkyl group having 2 to n carbon atoms, where 1 or 2 carbon atoms are replaced by heteroatoms such as N, O, S. The $(C_2-C_n)$-heteroalkylene group may also have substituents selected from the group consisting of $(C_1-C_{20})$-alkyl, $(C_6-C_{14})$-aryl, $(C_2-C_{10})$-alkenyl. In addition, the $(C_2-C_n)$-heteroalkylene group may be unsaturated, in which case the unsaturated section may be part of a heteroaromatic system.

The process according to the invention is conducted at a temperature within a range from 0° C. to 250° C., preferably within a range from 40° C. to 100° C., more preferably within a range from 50° C. to 80° C., and further preferably within a range from 50° C. to 60° C.

The reaction time is uncritical and is within a range from a few minutes to a few hours; it is preferably within a range from 30 minutes to 2 hours.

The process is generally conducted under protective gas atmosphere, preferably under nitrogen or argon, in which case the presence of oxygen can be tolerated under certain circumstances.

The process according to the invention is conducted without solvent. The ruthenium compound of the general formula $RuX^1X^2L^1_aL^2_b$ (I) is added to the reaction mixture (a) in solid form, or (b) dissolved in a diluent selected from the group consisting of benzene, toluene, tetrahydrofuran, dichloromethane, dichloroethane, trichloromethane, o-xylene, m-xylene, p-xylene, xylene isomer mixture and hexane; or (c) as a suspension in a diluent selected from the group consisting of hexane, heptane, petroleum benzine and mineral oil. The person skilled in the art can decide whether to add the ruthenium compound of the general formula $RuX^1X^2L^1_aL^2_b$ (I) in solid form or dissolved or suspended in a diluent. In general, it is possible to dispense with a diluent, especially when the cycloalkene or the cycloalkene mixture is liquid at the desired reaction temperature, or sufficiently large amounts of ruthenium compound of the general formula $RuX^1X^2L^1_aL^2_b$ (I) are used, which can be quantified by weighing. If desired, a diluent selected from the group consisting of benzene, toluene, tetrahydrofuran, dichloromethane, dichloroethane, trichloromethane, o-xylene, m-xylene, p-xylene, xylene isomer mixture and hexane is used for dissolution. Preferably, the diluent for dissolution is selected from the group consisting of dichloromethane, 1,2-dichloroethane, benzene, toluene, xylene and hexane. If desired, a diluent selected from the group consisting of hexane, heptane, petroleum benzine and mineral oil is used for suspension. The concentration of the ruthenium compound of the general formula $RuX^1X^2L^1_aL^2_b$ (I) in the diluent is 0.001 mol/l to 1 mol/l.

In the context of the present invention, the term "chain transfer agent" refers to all kinds of acyclic alkenes, irrespective of whether they are mono- or dienes, or whether they are acyclic internal alkenes or acyclic terminal alkenes, and also to vinylcycloalkenes and allyl acetate. The chain transfer agent serves to control the molecular weight distribution of the oligomer by terminating the growing chain. An acyclic internal alkene denotes an alkene wherein the C—C double bond is not on the alpha-carbon.

An acyclic terminal alkene denotes an alkene wherein the C—C double bond is on the alpha-carbon.

A diene denotes an alkene having two C—C double bonds.

An acyclic terminal diene has its C—C double bonds on the alpha- and omega-carbon atoms, and an acyclic internal diene has its C—C double bonds neither on the alpha- nor on the omega-carbon atom.

Examples of chain transfer agents are allyl acetate and the compounds of the general formula (d)-(i)

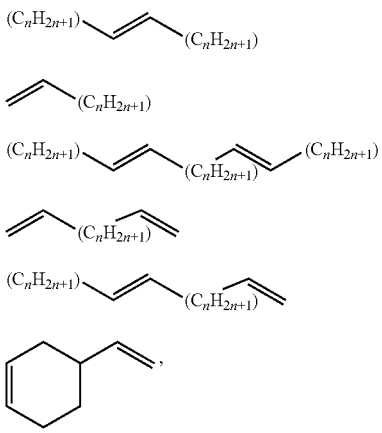

where n may independently be 1, 2, 3, 4, 5, 6, 7, 8, 9, 10, 11, 12, 13, 14, 15, 16, 17 or 18.

The alkenes may also be substituted by the substituents described hereinafter.

The substituents of the chain transfer agents are selected from the group consisting of
—{$C_1$-$C_{20}$}-alkyl,
—{$C_3$-$C_8$}-cycloalkyl,
—{$C_3$-$C_7$}-heterocycloalkyl,
—{$C_6$-$C_{14}$}-aryl,
—{$C_3$-$C_{14}$}-heteroaryl,
—{$C_6$-$C_{14}$}-aralkyl,
—{$C_1$-$C_{20}$}-alkyloxy,
—{$C_6$-$C_{14}$}-aryloxy,
—{$C_6$-$C_{14}$}-aralkyloxy,
—{$C_1$-$C_{20}$}-alkylthio,
—{$C_6$-$C_{14}$}-arylthio,
—{$C_6$-$C_{14}$}-aralkylthio,
—{$C_1$-$C_8$}-acyl,
—{$C_1$-$C_8$}-acyloxy,
—OH,
—C(=O)—O—{$C_1$-$C_{20}$}-alkyl,
—C(=O)—O—{$C_6$-$C_{14}$}-aryl,
—C(=O)—O—{$C_6$-$C_{14}$}-aralkyl,
—CN,
-halogen,
—{$C_1$-$C_{20}$}-perfluoroalkyl.

Preferably, the chain transfer agents are selected from the group consisting of allyl acetate and the following compounds:

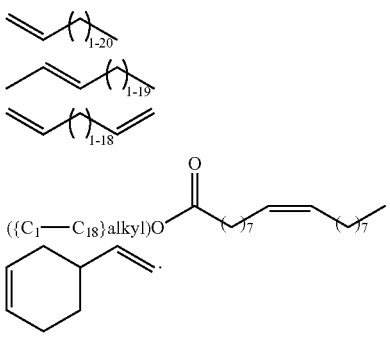

More preferably, the chain transfer agents are selected from the group consisting of allyl acetate and the following compounds:

In the context of the present invention, the molar ratio of ruthenium compound in the ring-opening metathetic polymerization is uncritical and is in the range from 1:200 to 1:1 000 000, based on the cycloalkene or the sum total of the cycloalkenes in the cycloalkene mixture, such that the molar amount (ruthenium compound):molar amount (cycloalkene or cycloalkene mixture)=1:200 to 1:1 000 000. Preferably, the molar ratio is in the range from 1:1000 to 1:100 000, and more preferably in the range from 1:10 000 to 1:100 000.

The molar ratio of the chain transfer agent is in the range from 1:5 to 1:1000, based on the cycloalkene or the sum total of the cycloalkenes in the cycloalkene mixture, such that molar amount (chain transfer agent):molar amount (cycloalkene or cycloalkene mixture)=1:5 to 1:1000. Preferably, the molar ratio is in the range from 1:6 to 1:100 and more preferably in the range from 1:6.6 to 1:14.3.

The molar mass distribution $M_n$ of the polymer (polyalkenamer) obtained by metathetic polymerization is within a range from 1000 g/mol to 150 000 g/mol, preferably within a range from 1000 g/mol to 50 000 g/mol. The molar mass distribution is measured by means of gel permeation chromatography (GPC) against polystyrene.

In one embodiment, the invention relates to a process for preparing polymers by means of ring-opening metathetic polymerization, comprising the following steps:
a. providing a reaction mixture consisting of a cycloalkene or a cycloalkene mixture,
b. adding a ruthenium compound of the general formula $RuX^1X^2L^1_aL^2_b$ (I) where
a=0 or 1, b=1 or 2, such that a+b=2;
$X^1$, $X^2$=independently selected anionic ligands;
$L^1$=uncharged π-binding ligand;
$L^2$=N-heterocyclic carbene of the formula IIa, IIb or IIc (IIa)

where
R and R' are each independently selected from the group consisting of methyl, ethyl, n-propyl, isopropyl, n-butyl, isobutyl, phenyl and p-methoxyphenyl; and R₁ and R₂ are each independently selected from the group consisting of hydrogen, (C₁-C₁₈)-alkyl, (C₃-C₈)-cycloalkyl, (C₃-C₇)-heterocycloalkyl, (C₆-C₁₄)-aryl, and (C₃-C₁₄)-heteroaryl;

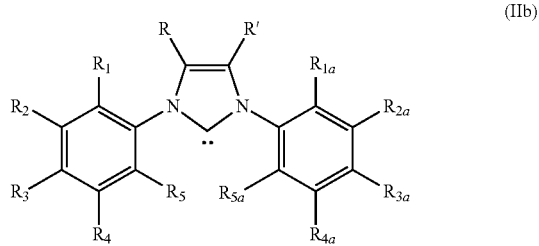

(IIb)

where
R and R' are each independently selected from the group consisting of H, methyl, ethyl, n-propyl, isopropyl, n-butyl, isobutyl, phenyl and p-methoxyphenyl; and
R₁, R₂, R₃, R₄, R₅, R₁ₐ, R₂ₐ, R₃ₐ, R₄ₐ, R₅ₐ are each independently selected from the group consisting of H, methyl, ethyl, n-propyl, isopropyl, n-butyl, isobutyl, tert-butyl and methoxy;

(IIc)

where
R is selected from the group consisting of H, methyl, ethyl, n-propyl, isopropyl, n-butyl, isobutyl, phenyl and p-methoxyphenyl; and
R' and R" are each independently selected from the group consisting of hydrogen, (C₁-C₁₈)-alkyl, (C₃-C₈)-cycloalkyl, (C₃-C₇)-heterocycloalkyl, (C₆-C₁₄)-aryl, and (C₃-C₁₄)-heteroaryl;
c. adding a chain transfer agent in a molar ratio in the range from 1:5 to 1:1000 based on the cycloalkene or the sum total of the cycloalkenes in the cycloalkene mixture,
d. converting at a temperature within a range from 0° C. to 250° C.,
e. adding a hydrogenation catalyst,
f. converting at a temperature within a range from 0° C. to 250° C. and at a hydrogen pressure within a range from 1 bar to 100 bar.

This embodiment of the process according to the invention comprises, as well as the ring-opening metathetic polymerization reaction (steps a-d), also a hydrogenation reaction (steps e+f). The polymer (polyalkenamer) obtained by ring-opening metathetic polymerization, on completion of the polymerization, without workup, is converted to the polyalkenamer by addition of a hydrogenation catalyst under a hydrogen atmosphere.

For process steps a)-d), the same conditions which have already been specified above apply to the terms "polymer", "reaction mixture", "cycloalkene", "cycloalkene mixture", "ruthenuim compound," "chain transfer agent" and the accompanying elucidations, and also the temperature and the reaction conditions.

Hydrogenation catalysts selected may be all hydrogenation catalysts contemplated by the person skilled in the art for this purpose. Preference is given to using those hydrogenation catalysts containing an active metal of group VIIIB of the Periodic Table of the Elements. Preferred metals are noble metals and Ni, especially Ru, Rh, Pd, Pt and Ni. The metals may be present in the hydrogenation catalyst either (a) as they are or in the form of oxides or (b) as metal complexes.

In case (a), the metal or metal oxide can either be applied to a support or be used as particles. The support material is unrestricted; typically, customary supports such as aluminium oxide, silicon dioxide, iron oxide, magnesium oxide, zirconium dioxide, carbon or similar supports known to the person skilled in the art in the field of hydrogenation are used. The content of metal or metal oxide on the support is selected within a range from 1% by weight to 25% by weight, based on the total weight of the catalyst. Preferably, a content of 1% to 5% by weight of metal or metal oxide on the support is selected. Examples of such hydrogenation catalysts are Pt/C, Pd/C, Ru/C, Pd/CaCO₃, Pd/Al₂O₃, Ru/Al₂O₃.

In case (b), the metals can also be used in the form of metal complexes as hydrogenation catalysts. Examples thereof are metal complexes of the metals Rh, Ir or Ru, such as e.g. the Wilkinson catalyst ClRh(PPh₃)₃ or [(dppb)Rh(cod)]BF₄, [Ir(PCy₃)(C₅H₅N)(cod)]PF₆, [Cl₂Ru(PPh₃)₃] and [(dppb)Ru(methallyl)₂].

The temperature which is set during the hydrogenation reaction is within a range from 0° C. to 250° C.; preferably, a temperature within a range from 20° C. to 120° C. is established. More preferably, a temperature from the range from 20° C. to 100° C. is established; most preferably, a temperature from the range from 40° C. to 80° C. is established.

The reaction time is uncritical and is within a range from a few minutes to a few hours; it is preferably within a range from 2 hours to 60 hours. The hydrogenation reaction is conducted under a hydrogen gas atmosphere, the hydrogen pressure being uncritical and being in the range from 1 bar to 100 bar, preferably from 1 bar to 60 bar, more preferably from 20 bar to 50 bar. The hydrogenation reaction can be conducted in all solvents or solvent mixtures which do not deactivate the hydrogenation catalyst. Preference is given to selecting aprotic solvents having low coordination properties. If the polymer mixture is liquid and stirrable at the desired reaction temperature, the hydrogenation can preferably be performed without solvent. Solvents are preferably selected from the group consisting of dichloromethane, 1,2-dichloroethane, benzene, toluene, xylene, chlorobenzene and hexane.

In the hydrogenation reaction, the molar ratio of hydrogenation catalyst to cycloalkene which is used in the preceding ring-opening metathetic polymerization is uncritical and is in the range from 1:100 to 1:1 000 000, preferably in the range from 1:1000 to 1:100 000 and more preferably in the range from 1:1000 to 1:2000.

In one embodiment, the invention relates to a process for preparing polymers by means of ring-opening metathetic polymerization, comprising the following steps:
a. providing a reaction mixture consisting of a cycloalkene or a cycloalkene mixture,
b. adding a ruthenium compound of the general formula RuX¹X²L¹ₐL²ᵦ (I) where
a=0 or 1, b=1 or 2, such that a+b=2;
X¹, X²=independently selected anionic ligands;

$L^1$=uncharged π-binding ligand;
$L^2$=N-heterocyclic carbene of the formula IIa, IIb or IIc

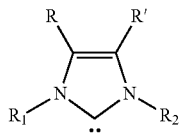
(IIa)

where
R and R' are each independently selected from the group consisting of methyl, ethyl, n-propyl, isopropyl, n-butyl, isobutyl, phenyl and p-methoxyphenyl; and
$R_1$ and $R_2$ are each independently selected from the group consisting of hydrogen, $(C_1\text{-}C_{18})$-alkyl, $(C_3\text{-}C_8)$-cycloalkyl, $(C_3\text{-}C_7)$-heterocycloalkyl, $(C_6\text{-}C_{14})$-aryl, and $(C_3\text{-}C_{14})$-heteroaryl;

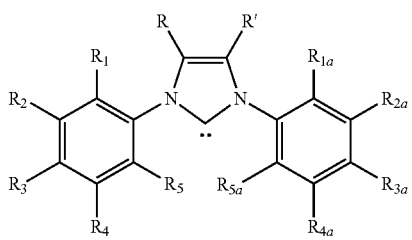
(IIb)

where
R and R' are each independently selected from the group consisting of H, methyl, ethyl, n-propyl, isopropyl, n-butyl, isobutyl, phenyl and p-methoxyphenyl; and
$R_1$, $R_2$, $R_3$, $R_4$, $R_5$, $R_{1a}$, $R_{2a}$, $R_{3a}$, $R_{4a}$, $R_{5a}$ are each independently selected from the group consisting of H, methyl, ethyl, n-propyl, isopropyl, n-butyl, isobutyl, tert-butyl and methoxy;

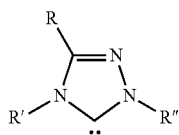
(IIc)

where
R is selected from the group consisting of H, methyl, ethyl, n-propyl, isopropyl, n-butyl, isobutyl, phenyl and p-methoxyphenyl; and
R' and R" are each independently selected from the group consisting of hydrogen, $(C_1\text{-}C_{18})$-alkyl, $(C_3\text{-}C_8)$-cycloalkyl, $(C_3\text{-}C_7)$-heterocycloalkyl, $(C_6\text{-}C_{14})$-aryl, and $(C_3\text{-}C_{14})$-heteroaryl;
c. adding a chain transfer agent in a molar ratio in the range from 1:5 to 1:1000 based on the cycloalkene or the sum total of the cycloalkenes in the cycloalkene mixture,
d. converting at a temperature within a range from 0° C. to 250° C.,
where a=1, b=1 for the ruthenium compound of formula $RuX^1X^2L^1_aL^2_b$ (I), and so a compound of the general formula $RuX^1X^2L^1L^2$ (VIII) is used.

In one embodiment, the invention relates to a process for preparing polymers by means of ring-opening metathetic polymerization, comprising the following steps:

a. providing a reaction mixture consisting of a cycloalkene or a cycloalkene mixture,
b. adding a ruthenium compound of the general formula $RuX^1X^2L^1_aL^2_b$ (I) where
a=0 or 1, b=1 or 2, such that a+b=2;
$X^1$, $X^2$=independently selected anionic ligands;
$L^1$=uncharged π-binding ligand;
$L^2$=N-heterocyclic carbene of the formula IIa, IIb or IIc

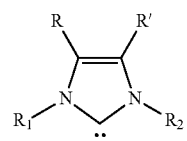
(IIa)

where
R and R' are each independently selected from the group consisting of methyl, ethyl, n-propyl, isopropyl, n-butyl, isobutyl, phenyl and p-methoxyphenyl; and
$R_1$ and $R_2$ are each independently selected from the group consisting of hydrogen, $(C_1\text{-}C_{18})$-alkyl, $(C_3\text{-}C_8)$-cycloalkyl, $(C_3\text{-}C_7)$-heterocycloalkyl, $(C_6\text{-}C_{14})$-aryl, and $(C_3\text{-}C_{14})$-heteroaryl;

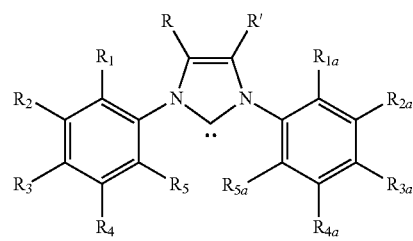
(IIb)

where
R and R' are each independently selected from the group consisting of H, methyl, ethyl, n-propyl, isopropyl, n-butyl, isobutyl, phenyl and p-methoxyphenyl; and
$R_1$, $R_2$, $R_3$, $R_4$, $R_5$, $R_{1a}$, $R_{2a}$, $R_{3a}$, $R_{4a}$, $R_{5a}$ are each independently selected from the group consisting of H, methyl, ethyl, n-propyl, isopropyl, n-butyl, isobutyl, tert-butyl and methoxy;

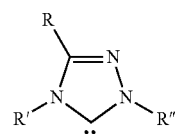
(IIc)

where
R is selected from the group consisting of H, methyl, ethyl, n-propyl, isopropyl, n-butyl, isobutyl, phenyl and p-methoxyphenyl; and
R' and R" are each independently selected from the group consisting of hydrogen, $(C_1\text{-}C_{18})$-alkyl, $(C_3\text{-}C_8)$-cycloalkyl, $(C_3\text{-}C_7)$-heterocycloalkyl, $(C_6\text{-}C_{14})$-aryl, and $(C_3\text{-}C_{14})$-heteroaryl;
c. adding a chain transfer agent in a molar ratio in the range from 1:5 to 1:1000 based on the cycloalkene or the sum total of the cycloalkenes in the cycloalkene mixture,
d. converting at a temperature within a range from 0° C. to 250° C., where a=1, b=1 for the ruthenium compound of formula $RuX^1X^2L^1_aL^2_b$ (I), and so a compound of the general formula $RuX^1X^2L^1L^2$ (VIII) is used, and where $X^1$ and $X^2$ are the same and are each chlorine, and where $L^1$ is selected from the group consisting of benzene, toluene, xylene, p-cymene, trimethylbenzene, tetramethylbenzene, hexamethylbenzene, tetrahydronaphthalene and naphthalene.

Preferred ruthenium compounds of the general formula $RuX^1X^2L^1L^2$ (VIII) can be found in Table 1.

TABLE 1

Preferred ruthenium compounds of the general formula (VIII)

| Ru compound | $X^1, X^2$ | $L^1$ | $L^2$ |
|---|---|---|---|
| 1 | Cl | benzene | III |
| 2 | Cl | benzene | IV |
| 3 | Cl | benzene | VI |
| 4 | Cl | benzene | VII |
| 5 | Cl | p-cymene | III |
| 6 | Cl | p-cymene | IV |
| 7 | Cl | p-cymene | VI |
| 8 | Cl | p-cymene | VII |
| 9 | Cl | hexamethylbenzene | III |
| 10 | Cl | hexamethylbenzene | IV |
| 11 | Cl | hexamethylbenzene | VI |
| 12 | Cl | hexamethylbenzene | VII |

Particular preference is given to compounds 5, 6, 7 and 8 from Table 1, and even further preference to compounds 5, 6 and 8.

In one embodiment, the invention relates to a process for preparing polymers by means of ring-opening metathetic polymerization, comprising the following steps:

a. providing a reaction mixture consisting of a cycloalkene or a cycloalkene mixture, b. adding a ruthenium compound of the general formula $RuX^1X^2L^1_aL^2_b$ (I) where a=0 or 1, b=1 or 2, such that a+b=2;

$X^1, X^2$=independently selected anionic ligands;

$L^1$=uncharged π-binding ligand;

$L^2$=N-heterocyclic carbene of the formula IIa, IIb or IIc

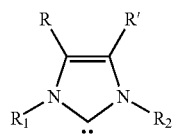

(IIa)

where

R and R' are each independently selected from the group consisting of methyl, ethyl, n-propyl, isopropyl, n-butyl, isobutyl, phenyl and p-methoxyphenyl; and $R_1$ and $R_2$ are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;

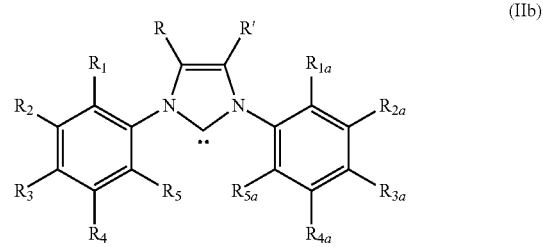

(IIb)

where

R and R' are each independently selected from the group consisting of H, methyl, ethyl, n-propyl, isopropyl, n-butyl, isobutyl, phenyl and p-methoxyphenyl; and $R_1, R_2, R_3, R_4, R_5, R_{1a}, R_{2a}, R_{3a}, R_{4a}, R_{5a}$ are each independently selected from the group consisting of H, methyl, ethyl, n-propyl, isopropyl, n-butyl, isobutyl, tert-butyl and methoxy;

(IIc)

where

R is selected from the group consisting of H, methyl, ethyl, n-propyl, isopropyl, n-butyl, isobutyl, phenyl and p-methoxyphenyl; and R' and R" are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;

c. adding a chain transfer agent in a molar ratio in the range from 1:5 to 1:1000 based on the cycloalkene or the sum total of the cycloalkenes in the cycloalkene mixture, d. converting at a temperature within a range from 0° C. to 250° C., where a=1, b=1 for the ruthenium compound of formula $RuX^1X^2L^1_aL^2_b$ (I), and so a compound of the general formula $RuX^1X^2L^1L^2$ (VIII) is used, and where $X^1$ and $X^2$ are the same and are each chlorine, and where $L^1$ is selected from the group consisting of benzene, toluene, xylene, p-cymene, trimethylbenzene, tetramethylbenzene, hexamethylbenzene, tetrahydronaphthalene and naphthalene, and $L^2$ is selected from the group consisting of N-heterocyclic carbenes of the formulae III, IV, VI and VII

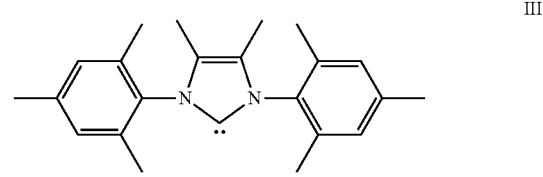

III

-continued

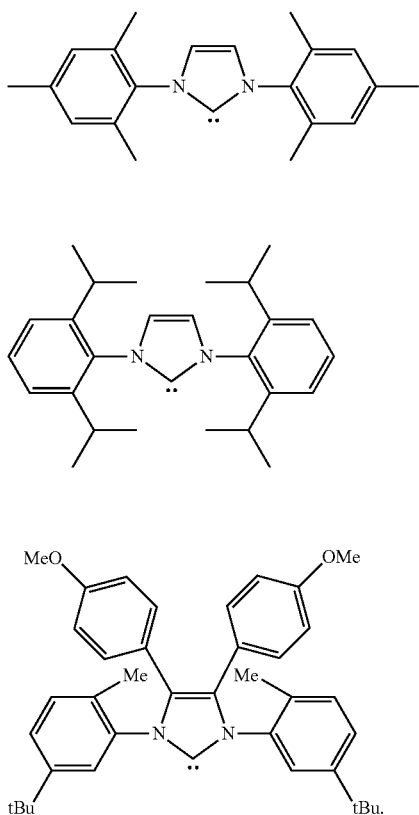

IV

VI

VII

In one embodiment, the invention relates to a process for preparing polymers by means of ring-opening metathetic polymerization, comprising the following steps:

a. providing a reaction mixture consisting of a cycloalkene or a cycloalkene mixture, b. adding a ruthenium compound of the general formula $RuX^1X^2L^1_aL^2_b$ (I) where a=0 or 1, b=1 or 2, such that a+b=2;

$X^1$, $X^2$=independently selected anionic ligands;

$L^1$=uncharged π-binding ligand;

$L^2$=N-heterocyclic carbene of the formula IIa, IIb or IIc

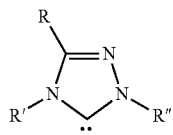

(IIa)

where

R and R' are each independently selected from the group consisting of methyl, ethyl, n-propyl, isopropyl, n-butyl, isobutyl, phenyl and p-methoxyphenyl; and $R_1$ and $R_2$ are each independently selected from the group consisting of hydrogen, $(C_1$-$C_{18})$-alkyl, $(C_3$-$C_8)$-cycloalkyl, $(C_3$-$C_7)$-heterocycloalkyl, $(C_6$-$C_{14})$-aryl, and $(C_3$-$C_{14})$-heteroaryl;

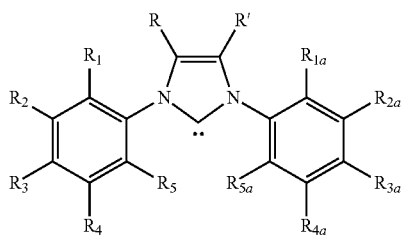

(IIb)

where

R and R' are each independently selected from the group consisting of H, methyl, ethyl, n-propyl, isopropyl, n-butyl, isobutyl, phenyl and p-methoxyphenyl; and $R_1$, $R_2$, $R_3$, $R_4$, $R_5$, $R_{1a}$, $R_{2a}$, $R_{3a}$, $R_{4a}$, $R_{5a}$ are each independently selected from the group consisting of H, methyl, ethyl, n-propyl, isopropyl, n-butyl, isobutyl, tert-butyl and methoxy;

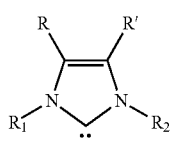

(IIc)

where

R is selected from the group consisting of H, methyl, ethyl, n-propyl, isopropyl, n-butyl, isobutyl, phenyl and p-methoxyphenyl; and R' and R" are each independently selected from the group consisting of hydrogen, $(C_1$-$C_{18})$-alkyl, $(C_3$-$C_8)$-cycloalkyl, $(C_3$-$C_7)$-heterocycloalkyl, $(C_6$-$C_{14})$-aryl, and $(C_3$-$C_{14})$-heteroaryl;

c. adding a chain transfer agent in a molar ratio in the range from 1:5 to 1:1000 based on the cycloalkene or the sum total of the cycloalkenes in the cycloalkene mixture, d. converting at a temperature within a range from 0° C. to 250° C., where a=1, b=1 for the ruthenium compound of formula $RuX^1X^2L^1_aL^2_b$ (I), and so a compound of the general formula $RuX^1X^2L^1L^2$ (VIII) is used, and where $X^1$ and $X^2$ are the same and are each chlorine, and where $L^1$ is selected from the group consisting of benzene, toluene, xylene, p-cymene, trimethylbenzene, tetramethylbenzene, hexamethylbenzene, tetrahydronaphthalene and naphthalene, and L2 is selected from the group consisting of N-heterocyclic carbenes of the formulae III, IV and VII

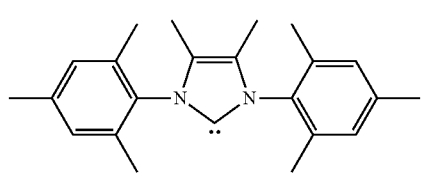

III

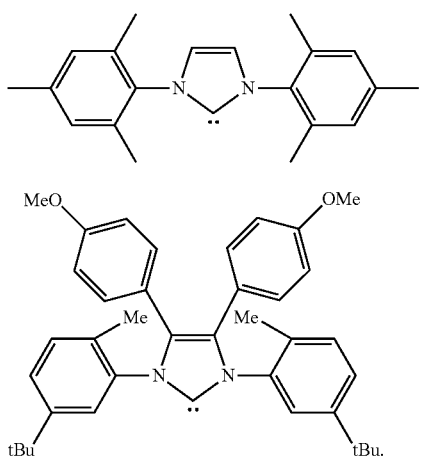

IV

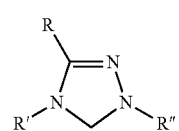

VII

In one embodiment, the invention relates to a process for preparing polymers by means of ring-opening metathetic polymerization, comprising the following steps:

a. providing a reaction mixture consisting of a cycloalkene or a cycloalkene mixture,
b. adding a ruthenium compound of the general formula $RuX^1X^2L^1{}_aL^2{}_b$ (I) where
   a=0 or 1, b=1 or 2, such that a+b=2;
   $X^1$, $X^2$ independently selected anionic ligands;
   $L^1$=uncharged π-binding ligand;
   $L^2$=N-heterocyclic carbene of the formula IIa, IIb or IIc

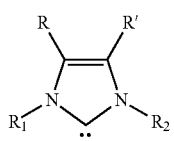
(IIa)

where
R and R' are each independently selected from the group consisting of methyl, ethyl, n-propyl, isopropyl, n-butyl, isobutyl, phenyl and p-methoxyphenyl; and
$R_1$ and $R_2$ are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;

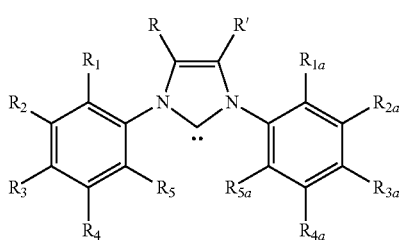
(IIb)

where
R and R' are each independently selected from the group consisting of H, methyl, ethyl, n-propyl, isopropyl, n-butyl, isobutyl, phenyl and p-methoxyphenyl; and $R_1$, $R_2$, $R_3$, $R_4$, $R_5$, $R_{1a}$, $R_{2a}$, $R_{3a}$, $R_{4a}$, $R_{5a}$ are each independently selected from the group consisting of H, methyl, ethyl, n-propyl, isopropyl, n-butyl, isobutyl, tert-butyl and methoxy;

(IIc)

where
R is selected from the group consisting of H, methyl, ethyl, n-propyl, isopropyl, n-butyl, isobutyl, phenyl and p-methoxyphenyl; and
R' and R" are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;

c. adding a chain transfer agent in a molar ratio in the range from 1:5 to 1:1000 based on the cycloalkene or the sum total of the cycloalkenes in the cycloalkene mixture,
d. converting at a temperature within a range from 0° C. to 250° C., where a=1, b=1 for the ruthenium compound of formula $RuX^1X^2L^1{}_aL^2{}_b$ (I), and so a compound of the general formula $RuX^1X^2L^1L^2$ (VIII) selected from the group consisting of compounds 5, 6, 7 and 8 is used

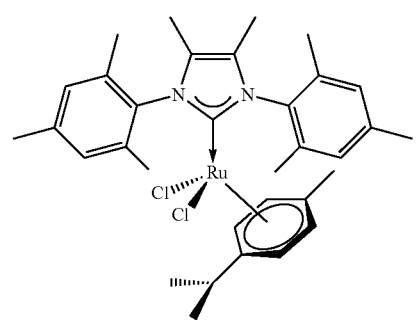
5

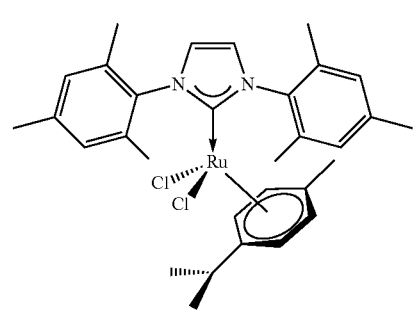
6

7

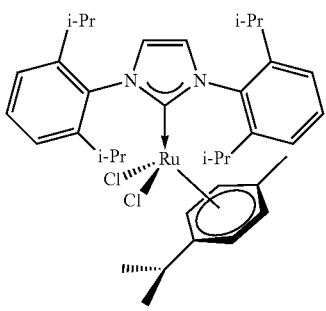

8

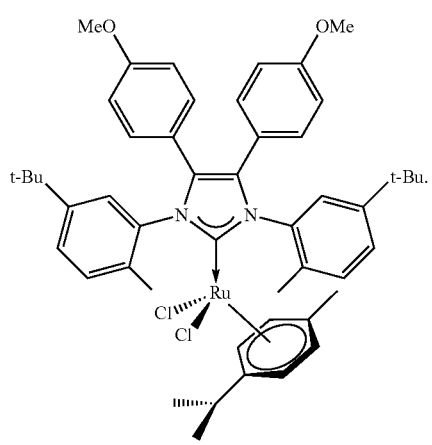

In one embodiment, the invention relates to a process for preparing polymers by means of ring-opening metathetic polymerization, comprising the following steps:

a. providing a reaction mixture consisting of a cycloalkene or a cycloalkene mixture, b. adding a ruthenium compound of the general formula $RuX^1X^2L^1_aL^2_b$ (I) where a=0 or 1, b=1 or 2, such that a+b=2;

$X^1$, $X^2$=independently selected anionic ligands;

$L^1$=uncharged π-binding ligand;

$L^2$=N-heterocyclic carbene of the formula IIa, IIb or IIc;

(IIa)

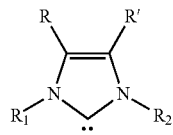

where

R and R' are each independently selected from the group consisting of methyl, ethyl, n-propyl, isopropyl, n-butyl, isobutyl, phenyl and p-methoxyphenyl; and $R_1$ and $R_2$ are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;

(IIb)

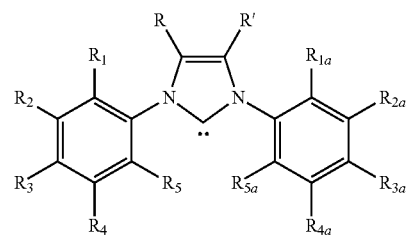

where

R and R' are each independently selected from the group consisting of H, methyl, ethyl, n-propyl, isopropyl, n-butyl, isobutyl, phenyl and p-methoxyphenyl; and $R_1$, $R_2$, $R_3$, $R_4$, $R_5$, $R_{1a}$, $R_{2a}$, $R_{3a}$, $R_{4a}$, $R_{5a}$, are each independently selected from the group consisting of H, methyl, ethyl, n-propyl, isopropyl, n-butyl, isobutyl, tert-butyl and methoxy;

(IIc)

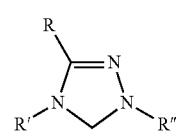

where

R is selected from the group consisting of H, methyl, ethyl, n-propyl, isopropyl, n-butyl, isobutyl, phenyl and p-methoxyphenyl; and R' and R" are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;

c. adding a chain transfer agent in a molar ratio in the range from 1:5 to 1:1000 based on the cycloalkene or the sum total of the cycloalkenes in the cycloalkene mixture, d. converting at a temperature within a range from 0° C. to 250° C., where a=1, b=1 for the ruthenium compound of formula $RuX^1X^2L^1_aL^2_b$ (I), and so a compound of the general formula $RuX^1X^2L^1L^2$ (VIII) selected from the group consisting of compounds 5, 6 and 8 is used

5

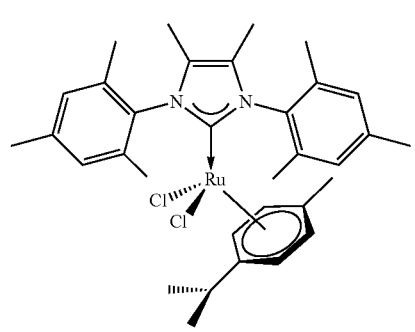

-continued

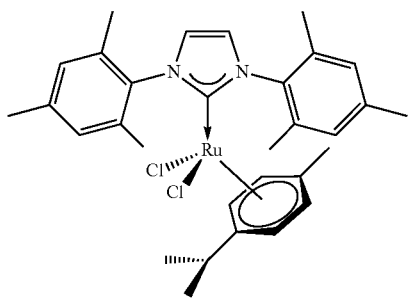

6

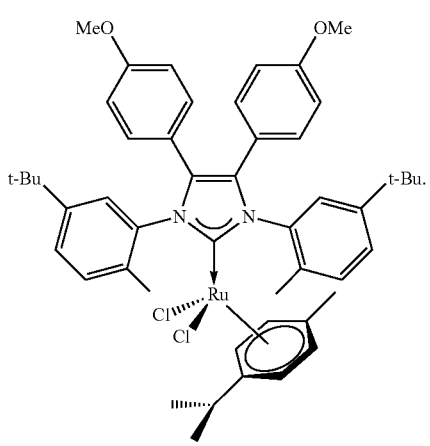

8

In one embodiment, the invention relates to a process for preparing polymers by means of ring-opening metathetic polymerization, comprising the following steps:
a. providing a reaction mixture consisting of a cycloalkene or a cycloalkene mixture,
b. adding a ruthenium compound of the general formula $RuX^1X^2L^1{}_aL^1{}_b$ (I) where
a=0 or 1, b=1 or 2, such that a+b=2;
$X^1$, $X^2$=independently selected anionic ligands;
$L^1$=uncharged π-binding ligand;
$L^2$=N-heterocyclic carbene of the formula IIa, IIb or IIc

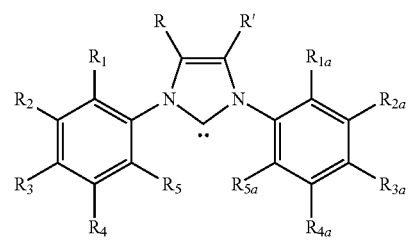

(IIa)

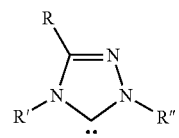

where
R and R' are each independently selected from the group consisting of methyl, ethyl, n-propyl, isopropyl, n-butyl, isobutyl, phenyl and p-methoxyphenyl; and
$R_1$ and $R_2$ are each independently selected from the group consisting of hydrogen, $(C_1$-$C_{18})$-alkyl, $(C_3$-$C_8)$-cycloalkyl, $(C_3$-$C_7)$-heterocycloalkyl, $(C_6$-$C_{14})$-aryl, and $(C_3$-$C_{14})$-heteroaryl;

(IIb)

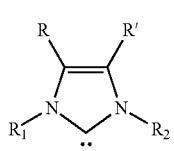

where
R and R' are each independently selected from the group consisting of H, methyl, ethyl, n-propyl, isopropyl, n-butyl, isobutyl, phenyl and p-methoxyphenyl; and
$R_1$, $R_2$, $R_3$, $R_4$, $R_5$, $R_{1a}$, $R_{2a}$, $R_{3a}$, $R_{4a}$, $R_{5a}$ are each independently selected from the group consisting of H, methyl, ethyl, n-propyl, isopropyl, n-butyl, isobutyl, tert-butyl and methoxy;

(IIc)

where
R is selected from the group consisting of H, methyl, ethyl, n-propyl, isopropyl, n-butyl, isobutyl, phenyl and p-methoxyphenyl; and
R' and R" are each independently selected from the group consisting of hydrogen, $(C_1$-$C_{18})$-alkyl, $(C_3$-$C_8)$-cycloalkyl, $(C_3$-$C_7)$-heterocycloalkyl, $(C_8$-$C_{14})$-aryl, and $(C_3$-$C_{14})$-heteroaryl;
c. adding a chain transfer agent in a molar ratio in the range from 1:5 to 1:1000 based on the cycloalkene or the sum total of the cycloalkenes in the cycloalkene mixture,
d. converting at a temperature within a range from 0° C. to 250° C.,
e. adding a hydrogenation catalyst,
f. converting at a temperature within a range from 0° C. to 250° C. and at a hydrogen pressure within a range from 1 bar to 100 bar,
where a=1, b=1 for the ruthenium compound of formula $RuX^1X^2L^1{}_aL^2{}_b$ (I), and so a compound of the general formula $RuX^1X^2L^1L^2$ (VIII) is used.

In one embodiment, the invention relates to a process for preparing polymers by means of ring-opening metathetic polymerization, comprising the following steps:
a. providing a reaction mixture consisting of a cycloalkene or a cycloalkene mixture, b. adding a ruthenium compound of the general formula $RuX^1X^2L^1{}_aL^2{}_b$ (I) where
a=0 or 1, b=1 or 2, such that a+b=2;
$X^1$, $X^2$=independently selected anionic ligands;
$L^1$=uncharged π-binding ligand;
$L^2$=N-heterocyclic carbene of the formula IIa, IIb or IIc

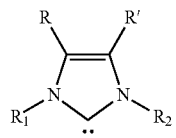
(IIa)

where
R and R' are each independently selected from the group consisting of methyl, ethyl, n-propyl, isopropyl, n-butyl, isobutyl, phenyl and p-methoxyphenyl; and
$R_1$ and $R_2$ are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;

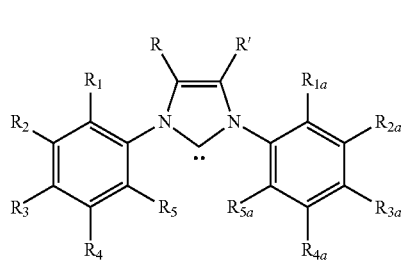
(IIb)

where
R and R' are each independently selected from the group consisting of H, methyl, ethyl, n-propyl, isopropyl, n-butyl, isobutyl, phenyl and p-methoxyphenyl; and
$R_1$, $R_2$, $R_3$, $R_4$, $R_5$, $R_{1a}$, $R_{2a}$, $R_{3a}$, $R_{4a}$, $R_{5a}$ are each independently selected from the group consisting of H, methyl, ethyl, n-propyl, isopropyl, n-butyl, isobutyl, tert-butyl and methoxy;

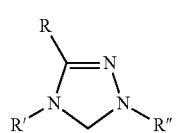
(IIc)

where
R is selected from the group consisting of H, methyl, ethyl, n-propyl, isopropyl, n-butyl, isobutyl, phenyl and p-methoxyphenyl; and
R' and R'' are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;
c. adding a chain transfer agent in a molar ratio in the range from 1:5 to 1:1000 based on the cycloalkene or the sum total of the cycloalkenes in the cycloalkene mixture,
d. converting at a temperature within a range from 0° C. to 250° C.,
e. adding a hydrogenation catalyst,
f. converting at a temperature within a range from 0° C. to 250° C. and at a hydrogen pressure within a range from 1 bar to 100 bar, where a=1, b=1 for the ruthenium compound of formula $RuX^1X^2L^1{}_aL^2{}_b$ (I), and so a compound of the general formula $RuX^1X^2L^1L^2$ (VIII) selected from the group consisting of compounds 5, 6, 7 and 8 is used

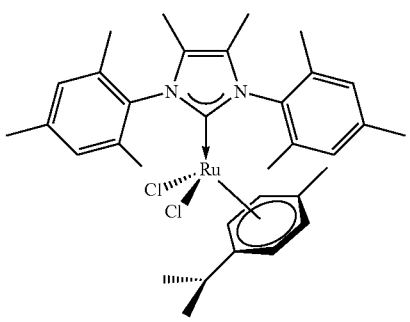
5

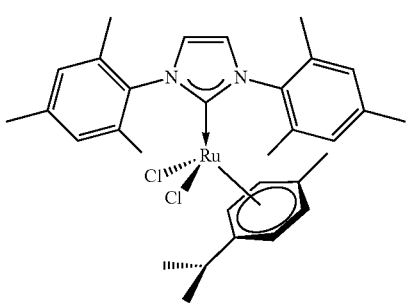
6

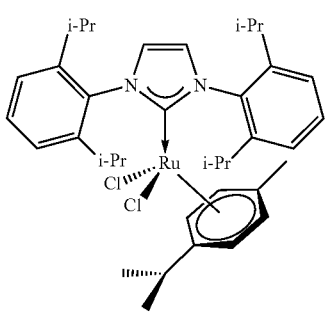
7

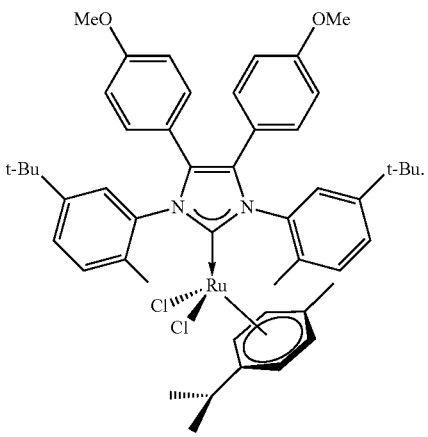
8

EXPERIMENTAL

The following ruthenium compounds were used for the metathesis reactions:

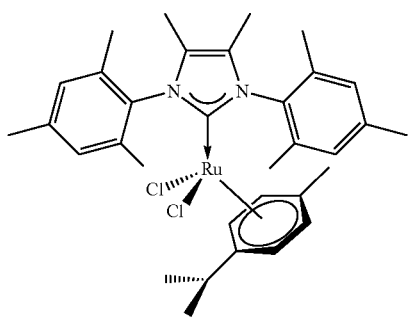

5

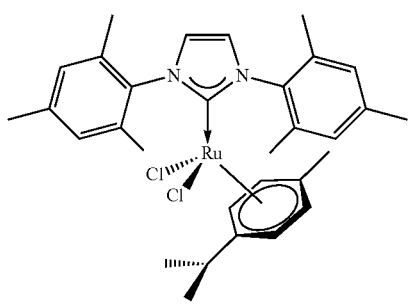

6

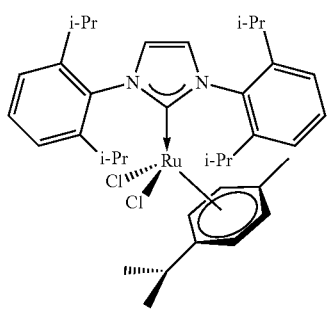

7

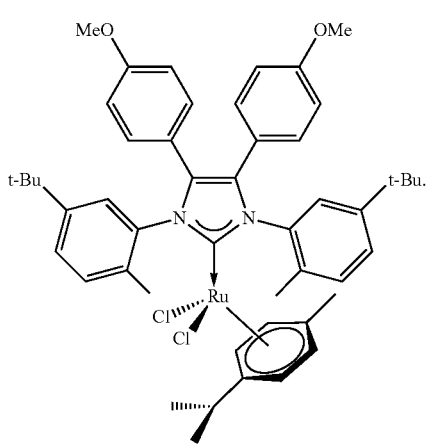

8

The examples below serve to illustrate the processes according to invention without restricting the invention thereto.

General Details

The reactions and the preparation of stock solutions of air-sensitive compounds were conducted in an argon-filled glovebox or in standard Schlenk flasks, and Schlenk apparatus. All the solvents were dried and purchased stored over molecular sieve. The cycloalkenes were degassed prior to the reaction if protective gas was employed. The molecular mass ($M_n$) and polydispersity (D) of the oligomeric products were determined against polystyrene by means of gel permeation chromatography. The conversion of the cycloalkenes was determined quantitatively against hexadecane by means of gas chromatography.

Examples 1 to 9

Ring-Opening Metathetic Polymerization of Dicyclopentadiene without Chain Transfer Agent The ruthenium catalyst 5 was examined with regard to its activity and the molecular mass ($M_n$) and polydispersity (D) of the reaction products in the ring-opening metathetic polymerization (ROMP) of dicyclopentadiene.

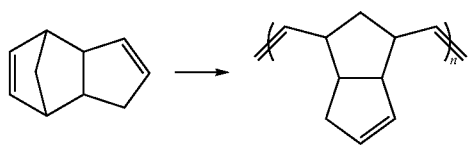

Example 1

A 8 ml glass vial which had been repeatedly evacuated and filled with inert gas was charged with 10.0 mmol of dicyclopentadiene and 0.1 mmol (10 000 ppm) of 5 in an argon stream, and heated to 60° C. The reaction mixture was stirred at this reaction temperature in an argon stream for 1 h.

Examples 2 to 3

An 8 ml glass vial which had been repeatedly evacuated and filled with inert gas was charged with 0.01 mmol (1000 ppm) of ruthenium catalyst 5 and 3 ml of dry toluene in an argon stream, and the catalyst solution was heated to 60° C. 10.0 mmol of dicyclopentadiene were added to the warm catalyst solution or to the catalyst. The reaction mixture was stirred at the desired reaction temperature in an argon stream for 1 h.

Examples 4-8

An 8 ml glass vial which had been repeatedly evacuated and filled with inert gas was charged with 10.0 mmol of dicyclopentadiene in an argon stream, and the reaction mixture was heated to 40° C.-80° C. 0.00001-0.001 mmol (1-100 ppm) of ruthenium catalyst 5 was dissolved in 50-500 μl of dry dichloromethane, and transferred in an argon stream into the warm reaction solution in the 8 ml glass vial. The reaction solution was stirred at the desired reaction temperature in an argon stream for 1 h.

Example 9

An 8 ml glass vial was charged with 10.0 mmol of dicyclopentadiene, and the reaction mixture was heated to 60° C. 0.0001 mmol (10 ppm) of ruthenium catalyst 5 was dissolved in 50 μl of dry dichloromethane, and transferred into the warm reaction solution in the 8 ml glass vial. The reaction solution was stirred at the desired reaction temperature for 1 h.

The specific reaction conditions and results for Examples 1 to 9 can be found in Table 2.

Examples 10 and 11

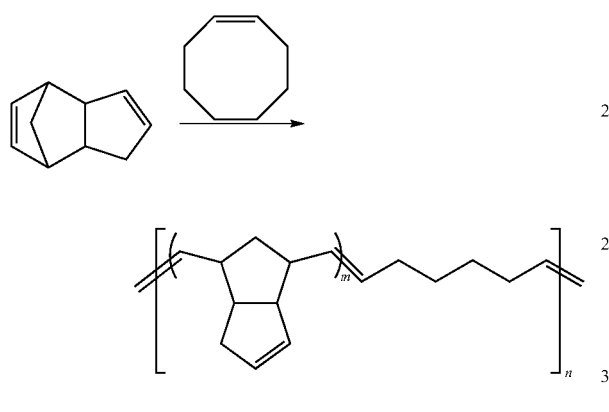

An 8 ml glass vial which had been repeatedly evacuated and filled with inert gas was charged with 10.0 mmol of dicyclopentadiene and 0.42-0.85 mmol of cyclooctene in an argon stream, and the reaction mixture was heated to 60° C. 0.0001 mmol (10 ppm) of ruthenium catalyst 5 was dissolved in 50 μl of dry dichloromethane, and transferred in an argon stream into the warm reaction solution in the 8 ml glass vial. The reaction solution was stirred at the desired reaction temperature in an argon stream for 1 h.

The specific reaction conditions and results for Examples 10 and 11 can be found in Table 2.

Examples 12 to 27

Copolymerization of Dicyclopentadiene with Chain Transfer Agent

The ruthenium catalyst 5 was examined with regard to its activity and the molecular mass ($M_n$) and polydispersity (D) of the reaction products in the copolymerization reaction of dicyclopentadiene with addition of chain transfer agents.

Examples 12 and 13

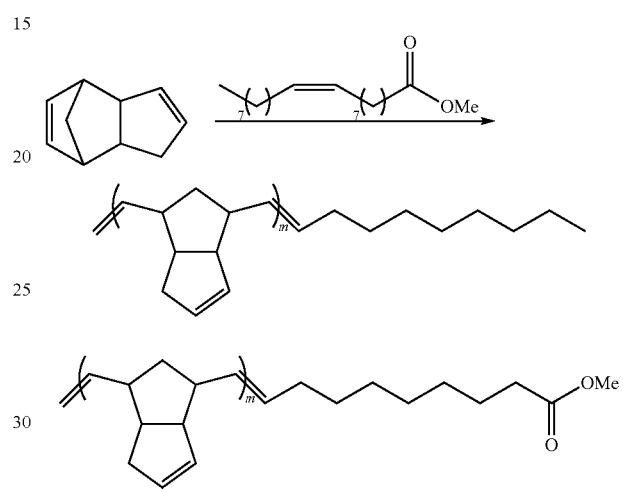

An 8 ml glass vial which had been repeatedly evacuated and filled with inert gas was charged with 10.0 mmol of dicyclopentadiene and 0.50-1.00 mmol of methyl oleate in an argon stream, and the reaction mixture was heated to 60° C. 0.0001 mmol (10 ppm) of ruthenium catalyst 5 was dissolved in 50 μl of dry dichloromethane, and transferred in an argon stream into the warm reaction solution in the 8 ml glass vial. The reaction solution was stirred at the desired reaction temperature in an argon stream for 1 h.

TABLE 2

ROMP of DCPD - catalyst loading

| Example | 5 [ppm] | Diluent | Temperature [° C.] | Conversion [%] [a] | $M_n$ [g/mol] [b] | D [b] |
|---|---|---|---|---|---|---|
| 1 | 10 000 | — | 60 | >99 | n.d. | n.d. |
| 2 | 1000 | 3 ml toluene | 60 | 99 | n.d. | n.d. |
| 3 | 1000 | 3 ml toluene | 60 | 85 | n.d. | n.d. |
| 4 | 100 | 50 μl $CH_2Cl_2$ | 60 | 99 | n.d. | n.d. |
| 5 | 10 | 50 μl $CH_2Cl_2$ | 60 | 61 | n.d. | n.d. |
| 6 | 10[d] | 50 μl $CH_2Cl_2$ | 40 | 39 | n.d. | n.d. |
| 7 | 10 | 50 μl $CH_2Cl_2$ | 80 | 32 | 1 608 950 | 1.89 |
| 8 | 1 | 50 μl $CH_2Cl_2$ | 60 | 37 | 1 203 800 | 1.79 |
| 9 | 10[c] | 50 μl $CH_2Cl_2$ | 60 | 26 | 333 115 | 2.84 |
| 10 | 10[e] | 50 μl $CH_2Cl_2$ | 60 | 48 | 241 770 | 3.45 |
| 11 | 10[f] | 50 μl $CH_2Cl_2$ | 60 | 44 | 204 455 | 5.12 |

Reaction conditions: Dicyclopentadiene (10 mmol), (p-cymene)Ru(Me$_2$IMes)Cl$_2$ (5) (1-10.000 ppm, 1 ppm = 0.0001 mol %), 40° C.-80° C., 1 h, inert gas atmosphere;
[a] determined by GC with external hexadecane standard,
[b] $M_n$ and D determined by means of gel permeation chromatography (GPC) against polystyrene as standard, n.d.—not determinable, $M_n$ and D not determinable for polymers insoluble in THF;
[c] reaction under air;
[d] reaction time 90 min;
[e] copolymerization with 4.2 mol % of cyclooctene;
[f] copolymerization with 8.5 mol % of cyclooctene.

The specific reaction conditions and results for Examples 12 and 13 can be found in Table 3.

Examples 14 and 15

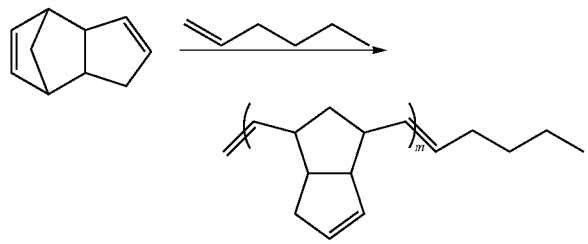

An 8 ml glass vial which had been repeatedly evacuated and filled with inert gas was charged with 10.0 mmol of dicyclopentadiene and 0.32-0.64 mmol of 1-hexene in an argon stream, and the reaction mixture was heated to 60° C. 0.0001 mmol (10 ppm) of ruthenium catalyst 5 was dissolved in 50 µl of dry dichloromethane, and transferred in an argon stream into the warm reaction solution in the 8 ml glass vial. The reaction solution was stirred at the desired reaction temperature in an argon stream for 1 h.

The specific reaction conditions and results for Examples 14 and 15 can be found in Table 3.

Examples 16-27

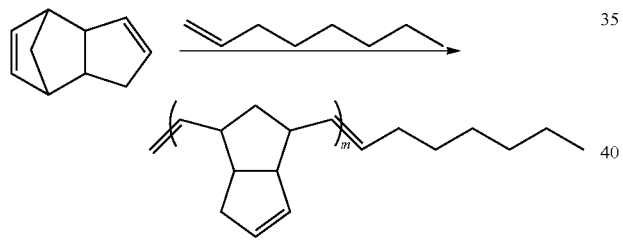

Examples 16 and 17

An 8 ml glass vial which had been repeatedly evacuated and filled with inert gas was charged with 10.0 mmol of dicyclopentadiene and 0.35-0.70 mmol of 1-octene in an argon stream, and the reaction mixture was heated to 60° C. 0.0001 mmol (10 ppm) of ruthenium catalyst 5 was dissolved in 50 µl of dry dichloromethane, and transferred in an argon stream into the warm reaction solution in the 8 ml glass vial. The reaction solution was stirred at the desired reaction temperature in an argon stream for 1 h.

Example 18

An 8 ml glass vial was charged with 10.0 mmol of dicyclopentadiene and 0.35-0.70 mmol of 1-octene, and the reaction mixture was heated to 60° C. 0.0001 mmol (10 ppm) of ruthenium catalyst 5 was dissolved in 50 µl of dichloromethane, and transferred into the warm reaction solution in the 8 ml glass vial. The reaction solution was stirred at the desired reaction temperature for 1 h.

Examples 19-21

A 20 ml glass vial which had been repeatedly evacuated and filled with inert gas was charged with 50.0 mmol of dicyclopentadiene and 3.5-7.0 mmol of 1-octene in an argon stream, and the reaction mixture was heated to 55° C. 0.0005 mmol (10 ppm)-0.001 mmol (20 ppm) of ruthenium catalyst 5 was dissolved in 100 µl of dry dichloromethane, and transferred in an argon stream into the warm reaction solution in the 20 ml glass vial. The reaction solution was stirred at the desired reaction temperature in an argon stream for 1 h.

Examples 22 and 23

A 250 ml Schlenk flask which had been repeatedly evacuated and filled with inert gas was charged with 1.0 mol of dicyclopentadiene and 70.0 mmol of 1-octene in an argon stream, and the reaction mixture was heated to 55° C. 0.01 mmol (10 ppm)-0.02 mmol (20 ppm) of ruthenium catalyst 5 was dissolved in 1 ml of dry dichloromethane, and transferred in an argon stream into the warm reaction solution in the 250 ml Schlenk flask. The reaction solution was stirred at the desired reaction temperature in an argon stream for 1 h.

Examples 24 and 25

An 8 ml glass vial which had been repeatedly evacuated and filled with inert gas was charged with 10.0 mmol of dicyclopentadiene and 0.35-0.70 mmol of 1-octene in an argon stream, and the reaction mixture was heated to 60° C. 0.001 mmol (100 ppm) of ruthenium catalyst 5 was dissolved in 50 µl of dry dichloromethane, and transferred in an argon stream into the warm reaction solution in the 8 ml glass vial. The reaction solution was stirred at the desired reaction temperature in an argon stream for 1 h.

The specific reaction conditions and results for Examples 16 to 25 can be found in Table 3.

Examples 26 and 27

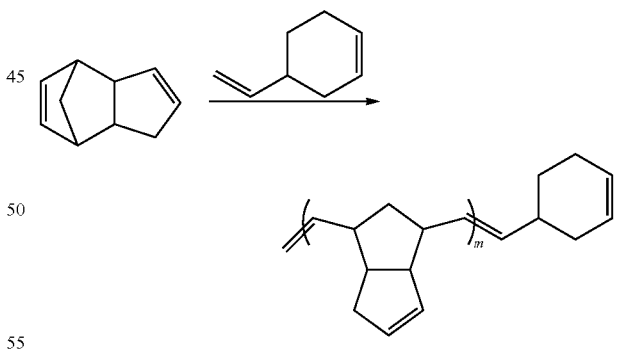

A 25 ml glass vial which had been repeatedly evacuated and filled with inert gas was charged with 100.0 mmol of dicyclopentadiene and 3.5-7.0 mmol of 4-vinyl-1-cyclohexene in an argon stream, and the reaction mixture was heated to 60° C. 0.001 mmol (10 ppm) of ruthenium catalyst 5 was dissolved in 100 µl of dry dichloromethane, and transferred in an argon stream into the warm reaction solution in the 25 ml glass vial. The reaction solution was stirred at the desired reaction temperature in an argon stream for 1 h. The specific reaction conditions and results for Examples 26 and 27 can be found in Table 3.

TABLE 3

Copolymerization of DCPD and a chain transfer agent

| Example | 5 [ppm] | Chain transfer agent | Chain transfer agent [mol %] | Conversion (a) | $M_n$ [g/mol][b] | D[b] |
|---|---|---|---|---|---|---|
| 12 | 10 | methyl oleate | 5.0 | 40 | 123 860 | 1.34 |
| 13 | 10 | methyl oleate | 10.0 | 64 | 60 352 | 3.48 |
| 14 | 10 | 1-hexene | 3.2 | 79 | 4833 | 2.62 |
| 15 | 10 | 1-hexene | 6.4 | 62 | 2457 | 2.54 |
| 16 | 10 | 1-octene | 3.5 | 46 | 5454 | 1.89 |
| 17 | 10 | 1-octene | 7.0 | 49 | 2246 | 2.62 |
| 18[c] | 10 | 1-octene | 3.5 | 31 | 6663 | 1.62 |
| 19[d] | 10 | 1-octene | 7.0 | 70 | 5406 | 2.15 |
| 20[d] | 10 | 1-octene | 15.0 | 67 | 2590 | 1.96 |
| 21[d] | 20 | 1-octene | 7.0 | 77 | 4563 | 2.20 |
| 22[e] | 10 | 1-octene | 7.0 | 76 | 3996 | 1.95 |
| 23[e] | 20 | 1-octene | 7.0 | 81 | 3505 | 1.94 |
| 24 | 100 | 1-octene | 3.5 | 97 | 7126 | 2.65 |
| 25 | 100 | 1-octene | 7.0 | 96 | 7749 | 3.65 |
| 26 | 10 | 4-vinyl-1-cyclohexene | 3.5 | 52 | 15 124 | 2.10 |
| 27 | 10 | 4-vinyl-1-cyclohexene | 7.0 | 64 | 6430 | 4.12 |

Reaction conditions: Dicyclopentadiene (10 mmol), (p-cymene)Ru(Me₂IMes)Cl₂ (5) (10-100 ppm = 0.001-0.01 mol %), 60° C., 1 h, inert gas atmosphere;
(a) determined by GC with external hexadecane standard,
[b]$M_n$ and D determined by means of gel permeation chromatography (GPC) against polystyrene as standard;
[c]reaction under air;
[d]50 mmol of dicyclopentadiene, 55° C.
[e]1000 mmol of dicyclopentadiene.

Examples 28 to 30

Catalyst Screening for the Copolymerization of Dicyclopentadiene with 1-Octene as Chain Transfer Agent Ruthenium catalysts 6 to 8 were examined with regard to their activity and the molecular mass ($M_n$) and polydispersity (D) of the reaction products in the copolymerization reaction of dicyclopentadiene with addition of 1-octene as chain transfer agent.

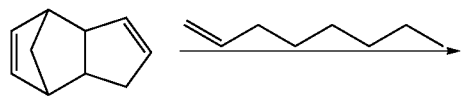

An 8 ml glass vial which had been repeatedly evacuated and filled with inert gas was charged with 10.0 mmol of dicyclopentadiene and 0.35 mmol of 1-octene in an argon stream, and the reaction mixture was heated to 60° C. 0.0001 mmol (10 ppm) of ruthenium catalyst 6 or 7 or 8 was dissolved in 50 µl of dry dichloromethane, and transferred in an argon stream into the warm reaction solution in the 8 ml glass vial. The reaction solution was stirred at the desired reaction temperature in an argon stream for 1 h.

The specific reaction conditions and results for Examples 28 to 30 can be found in Table 4.

TABLE 4

Catalyst screening

| Example | [Ru] complex | Conversion [%] [a] | Mn [g/mol] [b] | D [b] |
|---|---|---|---|---|
| 28 | 6 | 71 | 5424 | 2.33 |
| 29 | 7 | 22 | 5102 | 1.16 |
| 30 | 8 | 39 | 8076 | 1.76 |

Reaction conditions: Dicyclopentadiene (10 mmol), Ru complex (6-8) (10 ppm=0.001 mol %), 1-octene (3.5 mol %), 60° C., 1 h, inert gas atmosphere; [a] determined by GC with external hexadecane standard, [b] $M_n$ and D determined by means of gel permeation chromatography (GPC) against polystyrene as standard.

Examples 31 to 46

Copolymerization of Cycloalkenes with and without Chain Transfer Agent

The ruthenium catalyst 5 was examined with regard to its activity and the molecular mass ($M_n$) and polydispersity (D) of the reaction products in the copolymerization reaction of 2,5-norbornadiene, 2-norbornene, 1,5-cyclooctadiene and 1,5-cyclooctadiene with addition of 1-octene, or of 4-vinyl-1-cyclohexene or allyl acetate, as chain transfer agent.

Examples 31 to 34

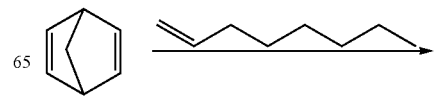

-continued

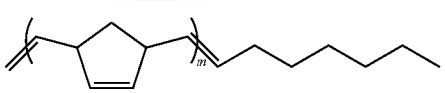

A 25 ml glass vial which had been repeatedly evacuated and filled with inert gas was charged with 100.0 mmol of 2-norbornadiene (NBD) and 0-7.0 mmol of 1-octene in an argon stream, and the reaction mixture was heated to 80° C. 0.001-0.1 mmol (10-1000 ppm) of ruthenium catalyst 5 was dissolved in 10-1000 µl of dry dichloromethane, and transferred in an argon stream into the warm reaction solution in the 25 ml glass vial. The reaction solution was stirred at the desired reaction temperature in an argon stream for 1 h.

The specific reaction conditions and results for Examples 31 to 34 can be found in Table 5.

Examples 35 to 37

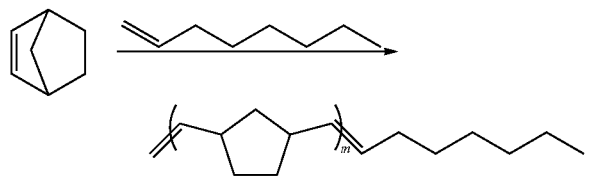

A 25 ml glass vial which had been repeatedly evacuated and filled with inert gas was charged with 100.0 mmol of 2-norbornene (NBE) and 0-7.0 mmol of 1-octene in an argon stream, and the reaction mixture was heated to 60° C. 0.001-0.01 mmol (10-100 ppm) of ruthenium catalyst 5 was dissolved in 10-100 µl of dry dichloromethane, and transferred in an argon stream into the warm reaction solution in the 25 ml glass vial. The reaction solution was stirred at the desired reaction temperature in an argon stream for 1 h.

The specific reaction conditions and results for Examples 35 to 37 can be found in Table 5.

Examples 38 and 39

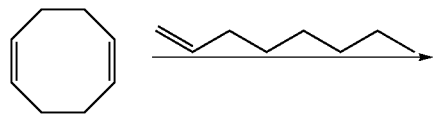

-continued

A 25 ml glass vial which had been repeatedly evacuated and filled with inert gas was charged with 100.0 mmol of 1,5-cyclooctadiene (COD) and 0-7.0 mmol of 1-octene in an argon stream, and the reaction mixture was heated to 80° C. 0.01 mmol (100 ppm) of ruthenium catalyst 5 was dissolved in 100 µl of dry dichloromethane, and transferred in an argon stream into the warm reaction solution in the 25 ml glass vial. The reaction solution was stirred at the desired reaction temperature in an argon stream for 1 h.

The specific reaction conditions and results for Examples 38 and 39 can be found in Table 5.

Examples 40 to 42

A 25 ml glass vial which had been repeatedly evacuated and filled with inert gas was charged with 100.0 mmol of cyclooctene (COE) and 7.0 mmol of 1-octene in an argon stream, and the reaction mixture was heated to 80° C. 0.001-0.01 mmol (10-100 ppm) of ruthenium catalyst 5 was dissolved in 10-100 µl of dry dichloromethane, and transferred in an argon stream into the warm reaction solution in the 25 ml glass vial. The reaction solution was stirred at the desired reaction temperature in an argon stream for 1 h.

The specific reaction conditions and results for Examples 40 to 42 can be found in Table 5.

Examples 43 to 46

A 25 ml glass vial which had been repeatedly evacuated and filled with inert gas was charged with 10.0 mmol of cyclooctene (COE) and 7.0 mmol of 4-vinyl-1-cyclohexene (VCH) or allyl acetate in an argon stream, and the reaction mixture was heated to 80° C. 0.001-0.01 mmol (10-100 ppm) of ruthenium catalyst 5 was dissolved in 10-100 µl of dry dichloromethane, and transferred in an argon stream into the warm reaction solution in the 25 ml glass vial. The reaction solution was stirred at the desired reaction temperature in an argon stream for 1 h.

The specific reaction conditions and results for Examples 43 to 46 can be found in Table 6.

TABLE 5

Copolymerization of cycloalkenes and 1-octene

| Example | Monomer | 5 [ppm] | $CH_2Cl_2$ [µl] | 1-octene [mol %] | Temp. [° C.] | Conversion [%] [a] | $M_n$ [g/mol] [b] | D [b] |
|---|---|---|---|---|---|---|---|---|
| 31 | NBD | 10 | 10 | 0 | 80 | 40 | 19 761 | 3.07 |
| 32 | NBD | 10 | 10 | 7 | 80 | 37 | 1489 | 1.35 |
| 33 | NBD | 100 | 100 | 7 | 80 | 40 | 2568 | 1.79 |
| 34 | NBD | 1000 | 1000 | 7 | 80 | 84 | 6775 | 2.46 |
| 35 | NBE | 100 | 100 | 0 | 60 | 87 | 6385 | 4.50 |
| 36 | NBE | 10 | 10 | 7 | 60 | 80 | 5007 | 3.55 |

TABLE 5-continued

Copolymerization of cycloalkenes and 1-octene

| Example | Monomer | 5 [ppm] | $CH_2Cl_2$ [µl] | 1-octene [mol %] | Temp. [° C.] | Conversion [%] [a] | $M_n$ [g/mol] [b] | D [b] |
|---|---|---|---|---|---|---|---|---|
| 37 | NBE | 100 | 100 | 7 | 60 | 98 | 3683 | 2.69 |
| 38 | COD | 100 | 100 | 0 | 80 | 26 | 42 384 | 2.79 |
| 39 | COD | 100 | 100 | 7 | 80 | 45 | 4170 | 2.01 |
| 40 | COE | 100 | 100 | 0 | 80 | 99 | 18 520 | 1.21 |
| 41 | COE | 10 | 10 | 7 | 80 | 20 | 3316 | 1.63 |
| 42 | COE | 100 | 100 | 7 | 80 | 95 | 5075 | 2.34 |

Reaction conditions: Monomer (10-100 mmol), (p-cymene)Ru(Me$_2$IMes)Cl$_2$ (5) (10-100 ppm = 0.001-0.01 mol % as a solution in 10-100 µl of CH$_2$Cl$_2$), 1 h, inert gas atmosphere;
[a] determined by GC with external hexadecane standard,
[b] $M_n$ and D determined by means of gel permeation chromatography (GPC) against polystyrene as standard.

TABLE 6

Copolymerization of cyclooctene and 7 mol % of chain transfer agent at 80° C.

| Example | Chain transfer agent | 5 [ppm] | $CH_2Cl_2$ [µl] | Conversion [%] [a] | $M_n$ [g/mol] [b] | D [b] |
|---|---|---|---|---|---|---|
| 43 | 4-vinyl-1-cyclohexene | 10 | 10 | 85 | 5346 | 2.86 |
| 44 | 4-vinyl-1-cyclohexene | 100 | 100 | 99 | 5435 | 2.26 |
| 45 | allyl acetate | 100 | 100 | 99 | 10 432 | 1.48 |
| 46 | allyl acetate | 50 | 10 | 68 | 5676 | 1.68 |

Reaction conditions: Monomer (10-100 mmol), (p-cymene)Ru(Me$_2$IMes)Cl$_2$ (5) (10-100 ppm = 0.001 - 0.01 mol %) in 10-100 µl of of dry dichloromethane, 1 h, inert gas atmosphere;
[a] determined by GC with external hexadecane standard,
[b] $M_n$ and D determined by means of gel permeation chromatography (GPC) against polystyrene as standard.

Examples 47 to 52

Oligomerization and Hydrogenation of DCPD with 1-Octene as Chain Transfer Agent

The hydrogenation catalyst [(dppb)Rh(COD)](BF$_4$) (IX) was examined with regard to its hydrogenation activity on dicyclopentadiene and the oligomeric products thereof and with regard to its influence on the molecular mass and polydispersity of the reaction products from the oligomerization reaction with the ruthenium catalyst 5.

Examples 47 to 50

A 20 ml glass vial which had been repeatedly evacuated and filled with inert gas was charged with 50.0 mmol of dicyclopentadiene (DCPD) and 7.0-15.0 mmol of 1-octene in an argon stream, and the reaction mixture was heated to 55° C. 0.005 mmol (10 ppm) of ruthenium catalyst 5 was dissolved in 500 µl of dry dichloromethane, and transferred in an argon stream into the warm reaction solution in the 20 ml glass vial. The reaction solution was stirred at the desired reaction temperature in an argon stream for 1 h. 0.05-0.5 mmol (100-1000 ppm) of [(dppb)Rh(COD)](BF$_4$)(IX) were dissolved in 50-500 µl of dry dichloromethane, and transferred in an argon stream into the 20 ml glass vial. The 20 ml glass vial was placed into a 50 ml autoclave in an argon stream, the latter was sealed tightly and hydrogen was injected to 50 bar. The reaction mixture was heated to 55° C. in the autoclave and stirred at the desired reaction temperature for 20 h. If the pressure in the autoclave went below the value of 30 bar, a hydrogen pressure of 50 bar was re-established by injection of hydrogen.

Example 51

A 20 ml glass vial which had been repeatedly evacuated and filled with inert gas was charged with 50.0 mmol of dicyclopentadiene (DCPD) and 15.0 mmol of 1-octene in an argon stream, and the reaction mixture was heated to 55° C. 0.005 mmol (10 ppm) of ruthenium catalyst 5 and 0.5 mmol (1000 ppm) of [(dppb)Rh(COD)](BF$_3$)(IX) were dissolved in 500 µl of dry dichloromethane, and transferred in an argon stream into the warm reaction solution in the 20 ml glass vial. The 20 ml glass vial was placed into a 50 ml autoclave in an argon stream, the latter was sealed tightly and hydrogen was injected to 50 bar. The reaction mixture was heated to 55° C. in the autoclave and stirred at the desired reaction temperature for 20 h. If the pressure in the autoclave went below the value of 30 bar, a hydrogen pressure of 50 bar was re-established by injection of hydrogen.

Example 52

A 20 ml glass vial which had been repeatedly evacuated and filled with inert gas was charged with 50.0 mmol of dicyclopentadiene (DCPD) and 15.0 mmol of 1-octene in an argon stream, and the reaction mixture was heated to 55° C. 0.005 mmol (10 ppm) of ruthenium catalyst 5 was dissolved in 500 µl of dry dichloromethane, and transferred in an argon stream into the warm reaction solution in the 20 ml glass vial. The reaction solution was stirred at the desired reaction temperature in an argon stream for 1 h. The reaction solution was admixed with 500 µl of butyl vinyl ether, and stirred at 55° C. for 10 min. 0.5 mmol (1000 ppm) of [(dppb)Rh(COD)](BF$_4$) (IX) was dissolved in 500 µl of dry dichloromethane, and transferred in an argon stream into the 20 ml glass vial. The 20 ml glass vial was placed into a 50 ml autoclave in an argon stream, the latter was sealed tightly and hydrogen was injected to 50 bar. The reaction mixture was heated to 55° C. in the autoclave and stirred at the desired reaction temperature for 20 h. If the pressure in the autoclave went below the value of 30 bar, a hydrogen pressure of 50 bar was re-established by injection of hydrogen.

The specific reaction conditions and results for Examples 47 to 52 can be found in Table 7.

TABLE 7

Oligomerization and hydrogenation of DCPD with 1-octene as chain transfer agent

| | | Copolymerization[a] | | | | Hydrogenation[a'] | | | | |
|---|---|---|---|---|---|---|---|---|---|---|
| | | | | | | | Yield of | Yield of | | |
| Example | 1-octene [mol %] | Conversion DCPD [%] [b,c] | CH$_2$Cl$_2$ [µl] | M$_n$ [g/mol] [c,d] | D [c,d] | IX [ppm] | Conversion DCPD [%] [b,e] | hydrogenated monomers [%] [f] | hydrogenated oligomers [%] [g] | M$_n$ [g/mol] [d,e] | D [d,e] |
| 47 | 7 | 74 | 500 | 5406 | 2.15 | 1000 | 99 | 16 | 79 | 4798 | 1.88 |
| 48 | 7 | 70 | 500 | 5814 | 2.39 | 100 | 94 | 5 | 17 | 6156 | 2.37 |
| 49 | 15 | 43 | 500 | 1927 | 1.59 | 1000 | >99 | 45 | 52 | 1813 | 1.64 |
| 50 | 15 | 72 | 500 | 2911 | 1.91 | 500 | 99 | 47 | 42 | 2637 | 1.71 |
| 51[h] | 15 | 27 | 500 | 3417 | 1.10 | 1000 | 99 | 75 | 25 | 2277 | 1.40 |
| 52[i] | 15 | 78 | 500 | 2977 | 2.05 | 1000 | >99 | 54 | 42 | 2500 | 1.63 |

[a]Reaction conditions: dicyclopentadiene (50 mmol), (p-cymene)Ru(Me$_2$IMes)Cl$_2$ (5) (10 ppm = 0.001 mol %), 55° C., 1 h, inert gas atmosphere;
[a']Reaction conditions: [(dppb)Rh(COD)](BF$_4$) (IX) (0-1000 ppm = 0-0.1 mol %), 55° C., 20 h, 50 bar H$_2$;
[b] determined by GC with external hexadecane standard;
[c] Conversion, M$_n$ and D prior to the hydrogenation
[d] M$_n$ and D determined by means of gel permeation chromatography (GPC) against polystyrene as standard;
[e] Conversion, M$_n$ and D after the hydrogenation;
[f] Yield of hydrogenated monomers having molar mass 134-136 g/mol, determined by GC with external hexadecane standard;
[g] Yield of hydrogenated oligomers determined by NMR;
[h]Hydrogenation catalyst IX present during copolymerization reaction;
[i]5 quenched with 500 µl of butyl vinyl ether after the copolymerization reaction.

Comparative Experiment 1

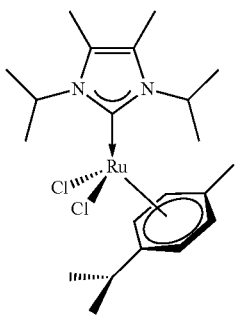

E

An 8 ml glass vial which had been repeatedly evacuated and filled with inert gas was charged with 1.32 g (10.0 mmol) of dicyclopentadiene in an argon stream, and the reaction mixture was heated to 60° C. 4.6 mg (0.01 mmol=1000 ppm) of E were dissolved in 500 µl of dry dichloromethane, and transferred under argon into the warm reaction solution in the 8 ml glass vial. The reaction solution was stirred at 80° C. under argon for 24 h. GC analysis with hexadecane as external standard showed no conversion of DCPD.

Comparative Experiment 2

F

An 8 ml glass vial which had been repeatedly evacuated and filled with inert gas was charged with 1.32 g (10.0 mmol) of dicyclopentadiene in an argon stream, and the reaction mixture was heated to 60° C. 5.4 mg (0.01 mmol=1000 ppm) of F were dissolved in 500 µl of dry dichloromethane, and transferred under argon into the warm reaction solution in the 8 ml glass vial. The reaction solution was stirred at 80° C. under argon for 24 h. GC analysis with hexadecane as external standard showed no conversion of DCPD.

The invention claimed is:

1. Process for preparing polymers by means of ring-opening metathetic polymerization, comprising the following steps:
   a. providing a reaction mixture consisting of a cycloalkene or a cycloalkene mixture,
   b. adding a ruthenium compound of the general formula RuX$^1$X$^2$L$^1_a$L$^2_b$ (I) where
      a=0 or 1, b=1 or 2, such that a+b=2;
      X$^1$, X$^2$=independently selected anionic ligands;
      L$^1$=uncharged π-binding ligand;
      L$^2$=N-heterocyclic carbene of the formula IIa, IIb or IIc (IIa)

where

R and R' are each independently selected from the group consisting of methyl, ethyl, n-propyl, isopropyl, n-butyl, isobutyl, phenyl and p-methoxyphenyl; and R$_1$ and R$_2$ are each independently selected from the group consisting of hydrogen, (C$_1$-C$_{18}$)-alkyl, (C$_3$-C$_8$)-cycloalkyl, (C$_3$-C$_7$)-heterocycloalkyl, (C$_6$-C$_{14}$)-aryl, and (C$_3$-C$_{14}$)-heteroaryl;

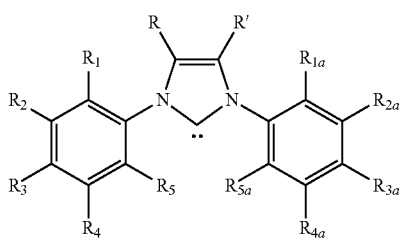

(IIb)

where

R and R' are each independently selected from the group consisting of H, methyl, ethyl, n-propyl, isopropyl, n-butyl, isobutyl, phenyl and p-methoxyphenyl; and $R_1$, $R_2$, $R_3$, $R_4$, $R_5$, $R_{1a}$, $R_{2a}$, $R_{3a}$, $R_{4a}$, $R_{5a}$ are each independently selected from the group consisting of H, methyl, ethyl, n-propyl, isopropyl, n-butyl, isobutyl, tert-butyl and methoxy;

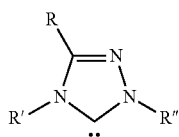

(IIc)

where

R is selected from the group consisting of H, methyl, ethyl, n-propyl, isopropyl, n-butyl, isobutyl, phenyl and p-methoxyphenyl; and R' and R'' are each independently selected from the group consisting of hydrogen, $(C_1-C_{18})$-alkyl, $(C_3-C_8)$-cycloalkyl, $(C_3-C_7)$-heterocycloalkyl, $(C_6-C_{14})$-aryl, and $(C_3-C_{14})$-heteroaryl;

c. adding a chain transfer agent in a molar ratio in the range from 1:5 to 1:1000 based on the cycloalkene or the sum total of the cycloalkenes in the cycloalkene mixture, d. converting at a temperature within a range from 0° C. to 250° C.

2. Process according to claim 1, wherein the cycloalkene is selected from the group consisting of compounds of the general formulae (a)-(c)

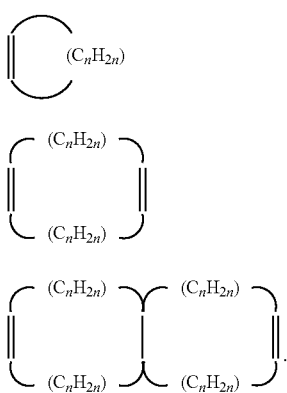

3. Process according to claim 1, wherein the chain transfer agent is selected from the group consisting of allyl acetate and compounds of the general formulae (d)-(i)

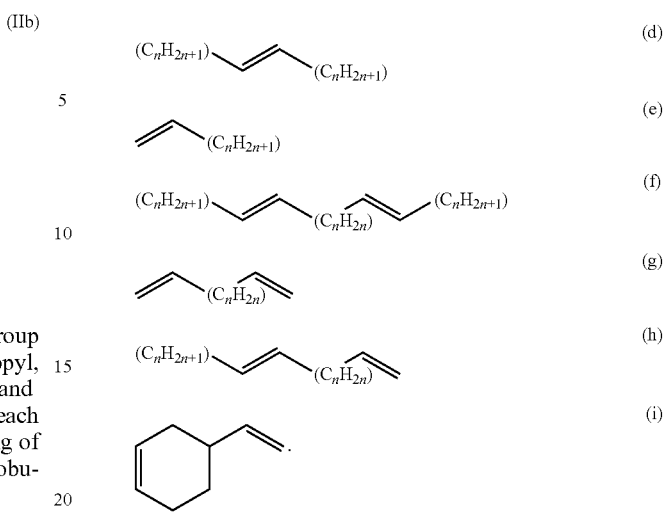

4. Process according to claim 1, wherein the molar ratio of ruthenium compound to cycloalkene is in the range from 1:200 to 1:1 000 000.

5. Process according to claim 1, wherein a=1, b=1 for the ruthenium compound of formula $RuX^1X^2L^1_aL^2_b$ (I), such that a compound of the general formula $RuX^1X^2L^1L^2$ (VIII) is used.

6. Process according to claim 5, wherein $X^1$ and $X^2$ are the same and are each chlorine, and wherein $L^1$ is selected from the group consisting of benzene, toluene, xylene, p-cymene, trimethylbenzene, tetramethylbenzene, hexamethylbenzene, tetrahydronaphthalene and naphthalene.

7. Process according to claim 6, wherein $L^2$ is selected from the group consisting of N-heterocyclic carbenes of the formulae III, IV, VI and VII

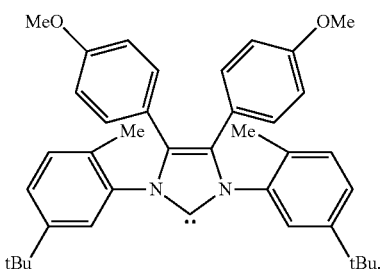

VII

8. Process according to claim 5, wherein the ruthenium compound of the general formula RuX$^1$X$^2$L$^1$L$^2$ (VIII) is selected from the group consisting of compounds 5, 6, 7 and 8

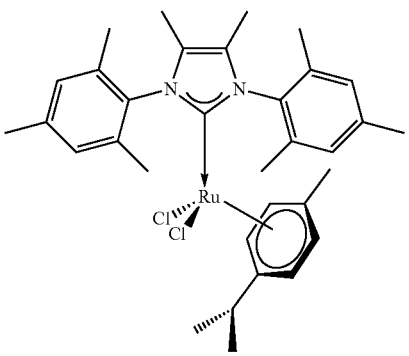

5

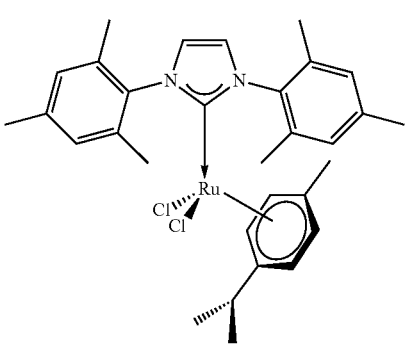

6

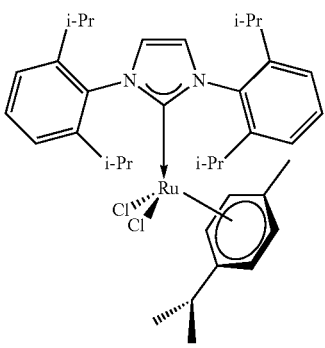

7

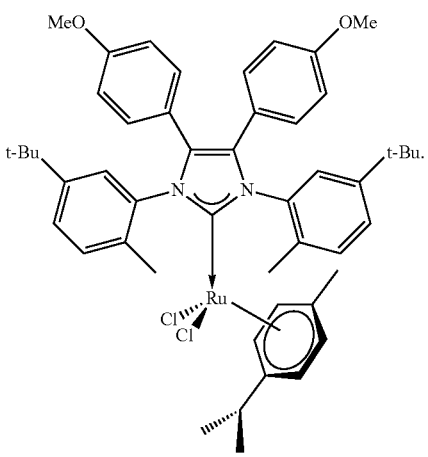

8

9. Process according to claim 2, wherein the chain transfer agent is selected from the group consisting of allyl acetate and compounds of the general formulae (d)-(i)

$(C_nH_{2n+1})\diagup\!\!\!\diagup\!\!\!\diagdown(C_nH_{2n+1})$     (d)

$\diagup\!\!\!\diagup(C_nH_{2n+1})$     (e)

$(C_nH_{2n+1})\diagup\!\!\!\diagup\!\!\!\diagdown(C_nH_{2n})\diagup\!\!\!\diagdown(C_nH_{2n+1})$     (f)

$\diagup\!\!\!\diagup(C_nH_{2n})\diagup\!\!\!\diagup$     (g)

$(C_nH_{2n+1})\diagup\!\!\!\diagup\!\!\!\diagdown(C_nH_{2n})\diagup\!\!\!\diagup$     (h)

(i)

10. Process according to claim 9, wherein the molar ratio of ruthenium compound to cycloalkene is in the range from 1:200 to 1:1 000 000.

11. Process according to claim 10, wherein a=1, b=1 for the ruthenium compound of formula RuX$^1$X$^2$L$^1_a$L$^2_b$ (I), such that a compound of the general formula RuX$^1$X$^2$L$^1$L$^2$ (VIII) is used.

12. Process according to claim 11, wherein X$^1$ and X$^2$ are the same and are each chlorine, and wherein L$^1$ is selected from the group consisting of benzene, toluene, xylene, p-cymene, trimethylbenzene, tetramethylbenzene, hexamethylbenzene, tetrahydronaphthalene and naphthalene.

13. Process according to claim 12, wherein L$^2$ is selected from the group consisting of N-heterocyclic carbenes of the formulae III, IV, VI and VII III
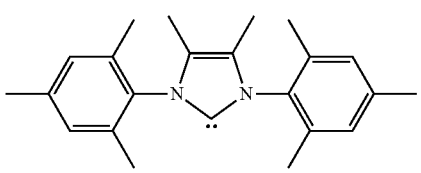

IV
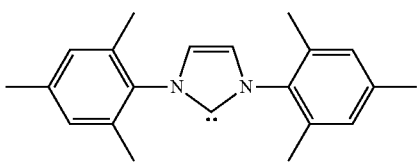

VI
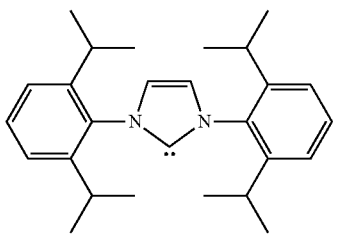

VII
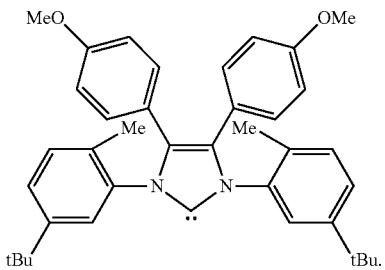

14. Process according to claim 11, wherein the ruthenium compound of the general formula $RuX^1X^2L^1L^2$ (VIII) is selected from the group consisting of compounds 5, 6, 7 and 8

5
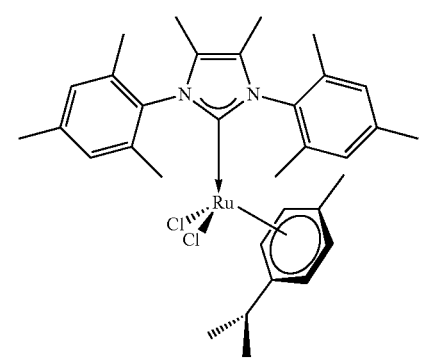

-continued

6
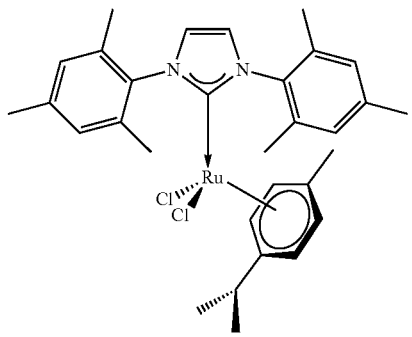

7
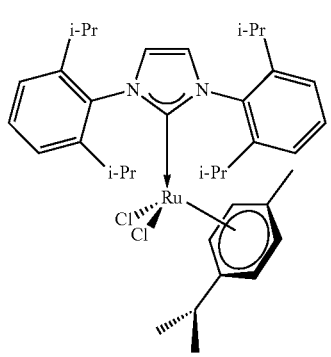

8
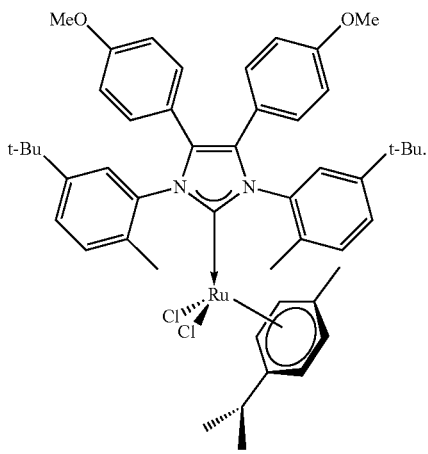

15. Process according to claim 1, wherein the following steps are also included after step d.:
  e. adding a hydrogenation catalyst,
  f. converting at a temperature within a range from 0° C. to 250° C. and at a hydrogen pressure within a range from 1 bar to 100 bar.

16. Process according to claim 15, wherein the molar ratio of hydrogenation catalyst to cycloalkene used is in the range from 1:100 to 1:1 000 000.

17. Process according to claim 15, wherein the cycloalkene is selected from the group consisting of compounds of the general formulae (a)-(c)

(a)

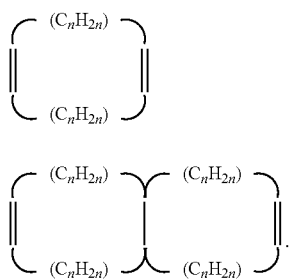

(b)

(c)

18. Process according to claim 15, wherein the chain transfer agent is selected from the group consisting of allyl acetate and compounds of the general formulae (d)-(i)

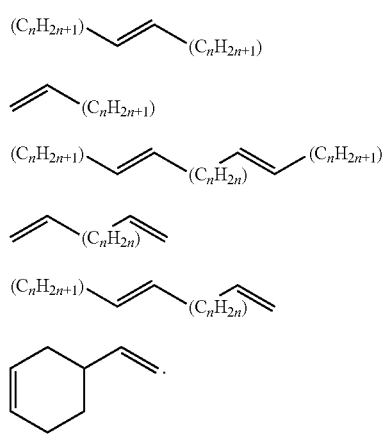

(d)

(e)

(f)

(g)

(h)

(i)

19. Process according to claim 15, wherein the molar ratio of ruthenium compound to cycloalkene is in the range from 1:200 to 1:1 000 000.

20. Process according to claim 15, wherein a=1, b=1 for the ruthenium compound of formula $RuX^1X^2L^1{}_aL^2{}_b$ (I), such that a compound of the general formula $RuX^1X^2L^1L^2$ (VIII) is used.

21. Process according to claim 20, wherein the ruthenium compound of the general formula $RuX^1X^2L^1L^2$ (VIII) is selected from the group consisting of compounds 5, 6, 7 and 8

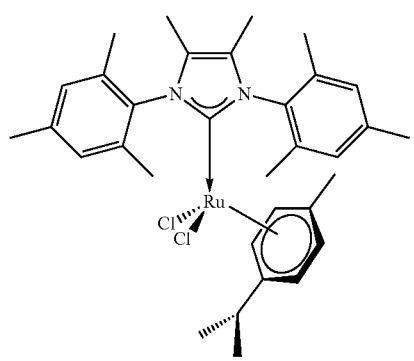

5

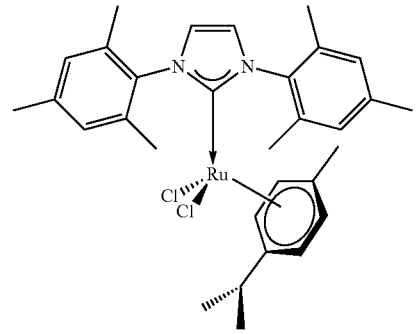

6

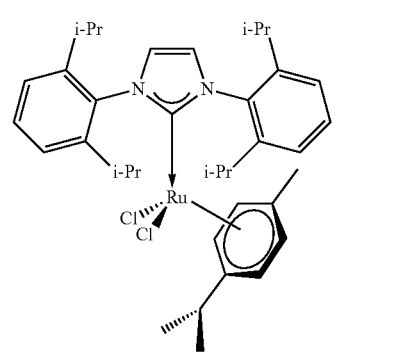

7

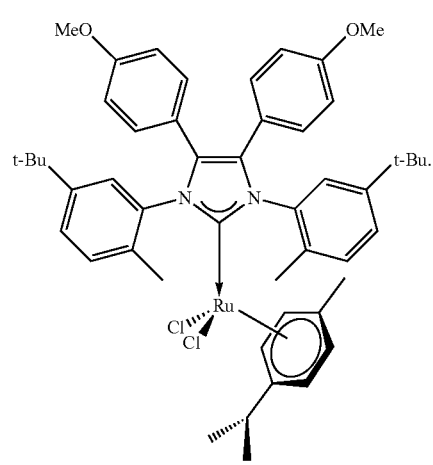

8

22. Process according to claim 16, wherein the cycloalkene is selected from the group consisting of compounds of the general formulae (a)-(c)

(a)

(b)

-continued

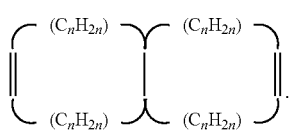
(c)

23. Process according to claim 22, wherein the chain transfer agent is selected from the group consisting of allyl acetate and compounds of the general formulae (d)-(i)

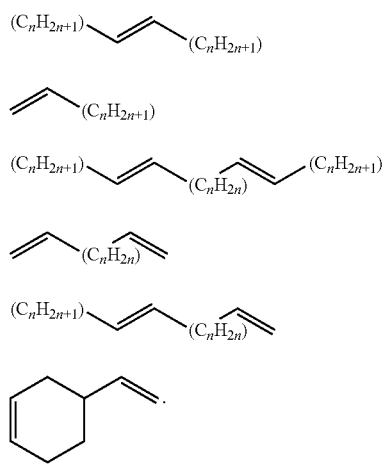

24. Process according to claim 23, wherein the molar ratio of ruthenium compound to cycloalkene is in the range from 1:200 to 1:1 000 000.

25. Process according to claim 24, wherein a=1, b=1 for the ruthenium compound of formula $RuX^1X^2L^1{}_aL^2{}_b$ (I), such that a compound of the general formula $RuX^1X^2L^1L^2$ (VIII) is used.

26. Process according to claim 25, wherein $X^1$ and $X^2$ are the same and are each chlorine, and wherein $L^1$ is selected from the group consisting of benzene, toluene, xylene, p-cymene, trimethylbenzene, tetramethylbenzene, hexamethylbenzene, tetrahydronaphthalene and naphthalene.

27. Process according to claim 26, wherein $L^2$ is selected from the group consisting of N-heterocyclic carbenes of the formulae III, IV, VI and VII

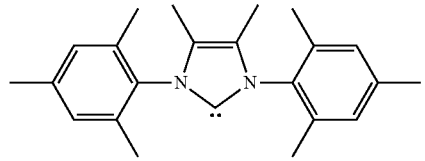
III

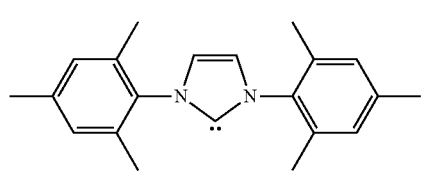
IV

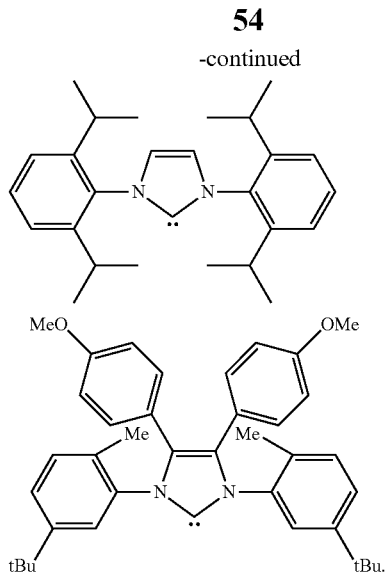
VI

VII

28. Process according to claim 25, wherein the ruthenium compound of the general formula $RuX^1X^2L^1L^2$ (VIII) is selected from the group consisting of compounds 5, 6, 7 and 8

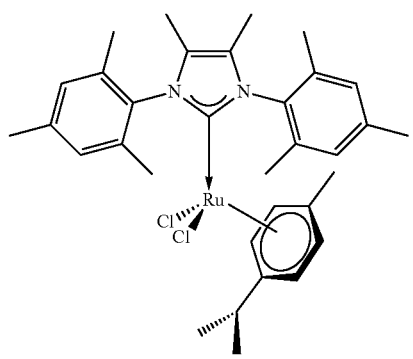
5

6

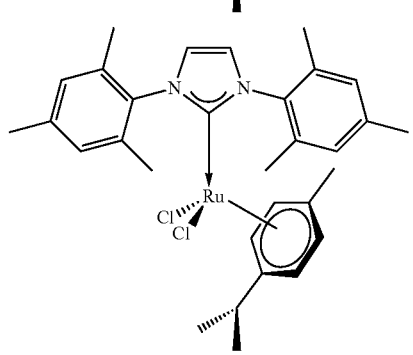
7

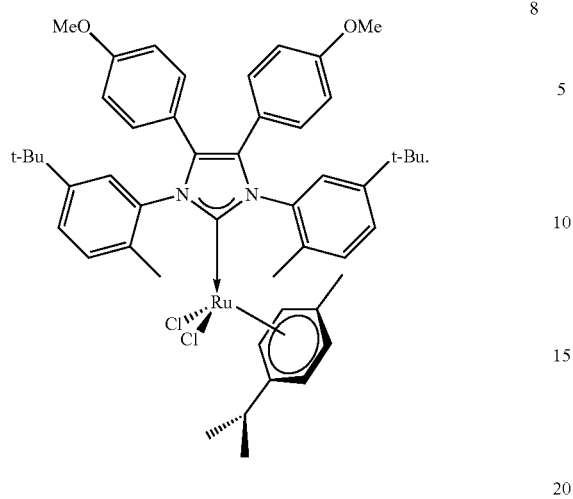
* * * * *